United States Patent [19]
Goodrich

[11] Patent Number: 4,833,708
[45] Date of Patent: May 23, 1989

[54] REMOTE CABLE PAIR CROSS-CONNECT SYSTEM

[75] Inventor: Whitney E. Goodrich, Boulder, Colo.

[73] Assignee: Remote Switch Systems, Inc., Loveland, Colo.

[21] Appl. No.: 122,678

[22] Filed: Nov. 19, 1987

[51] Int. Cl.⁴ .............................................. H01Q 3/60
[52] U.S. Cl. .................................. 379/327; 379/334; 379/335
[58] Field of Search .............. 379/325, 326, 327, 333, 379/334, 335, 337

[56] References Cited

U.S. PATENT DOCUMENTS

| | | | |
|---|---|---|---|
| 3,462,557 | 8/1969 | Brooks et al. | 379/334 |
| 3,917,908 | 11/1975 | Galluccio | 379/334 X |
| 4,670,626 | 6/1987 | Fisher et al. | 379/326 X |

*Primary Examiner*—James L. Dwyer
*Attorney, Agent, or Firm*—David B. Harrison

[57] ABSTRACT

A telecommunications system includes at least one central office having an electronic supervisor for supervising a plurality of outside plant electronic cross-connect cabinets and a plurality of electronic cross-connect cabinets located remotely from the central office for automatically connecting and disconnecting distribution pairs to feeder pairs terminated at the cabinets. Each cabinet is connected to the electronic supervisor via a control pair in a feeder cable extending from the central office to the cabinet. The electronic supervisor at the central office automatically locates, verifies the identity of, and supervises automatic switching operations at a selected one of the plurality of electronic cross-connect cabinets by providing operating power and signalling information to the selected one via the control cable to which it is attached. Details of the electronic cross-connect cabinet independently form an aspect of the present invention.

20 Claims, 13 Drawing Sheets

FIG. 2  CENTRAL OFFICE CONTROL UNIT 22

4,833,708

REMOTE CABLE PAIR CROSS-CONNECT SYSTEM

FIELD OF THE INVENTION

The present invention relates to remotely controlled, automated telephone system outside plant cross-connect switching apparatus and methods. More particularly, the present invention relates to electronically controlled, remotely actuated cross-connection cabinets and associated control equipment for use by operating telephone companies in lieu of manual cross-connect cabinets previously in use.

BACKGROUND OF THE INVENTION

Cross-connect cabinets and boxes perform a major role in the management of outside plant telephone cable installations. These cabinets serve as distribution and concentration points by which trunks carrying pairs known as "feeders" extending from the central office may be distributed among service subscriber telephone pairs. Typically, there are more service subscriber distribution pairs than there are central office feeder pairs. In the past, the usual convention has been to provide twice as many distribution pairs as there are central office feeder pairs. However, the modern trend is to maximize distribution plant utilization so that one and one half to one, and even one to one correlation between the number of feeder pairs and the number of distribution pairs is presently proposed. More precisely the conventional cross-connect cabinet enables a feeder pair manually to be connected to any one of the subscriber pairs terminated therein.

Cross-connect cabinets usually are provided in standard sizes, such as 900 pair (300 feeder/600 distribution), 1200 pair (400 feeder/800 distribution), 1800 pair (600 feeder, 1200 distribution), 2400 pair (800 feeder/1600 distribution), 2700 pair (900 feeder/1800 distribution), 3600 pair (1200 feeder/2400 distribution), and 5400 pair (1800 feeder/3600 distribution).

Feeder cable is routed directly from a central office telephone switching facility to a cross-connect cabinet. Feeder cables are usually large (300 to 1800 pairs), and they are usually pressurized with dry gas. Since cross-connect cabinets have typically served as cable concentrators as well as distribution points, a higher percentage of feeder cable pairs ar likely to be in use than the percentage of distribution pairs in use. Conventionally, a feeder cable spans most of the distance from the central office to the service subscriber's location. In a residential neighborhood it is usual to find a cross-connect cabinet located within a few blocks of the subscriber.

Multi-pair distribution cables typically extend the distribution pairs from the cross-connect cabinet to terminal boxes at or very near the subscriber's premises. Terminal boxes are typically configured in multiples of 25 distribution pairs, with a corresponding number of subscriber drop pairs connected or connectable to the distribution pairs. In rural situations, terminal boxes come in sizes from 4 to 12 pairs, as well as 25. Terminal boxes are conventionally located so that they may be accessed by service personnel, but typically such boxes are not as accessible as cross-connect cabinets Terminal boxes may be located at ground level (pedestals), suspended aerially from telephone cable messenger wires strung between utility poles, and also inside of office buildings in telephone equipment rooms. Terminal boxes are not buried or otherwise placed below ground level in any environment subject to water intrusion, since they are not air tight. In some instances a breakout of four pairs is made as a direct splice in a distribution cable, and there is no external terminal box or block. These breakouts are usually installed when the distribution cable is buried, but remain idle until they are required.

Cross-connect cabinets end up servicing all types of telephone service subscriber groups. In general, however, these groupings fall into one or more categories of: rural, suburban, urban or commercial/industrial. The attributes of a rural cross-connect cabinet are that the service type is primarily residential and scattered over a wide service area. Numerous small terminal boxes are provided throughout the service area with multiple appearances of the distribution pairs Historically, there has been little subscriber service order activity The attributes of a suburban cross-connect cabinet are that the service type is primarily residential and is distributed throughout a smaller area than the rural service area. Many small terminals (4-12 pair) or four pair breakouts are evenly spaced, with one terminal appearance provided for each distribution pair. A low to moderate amount of subscriber service order activity is encountered; however the level is higher than in the rural setting. Crossconnect cabinets in 1 suburban areas are typically readily accessible and are serviced more frequently than rural cabinets, due to the higher incidences of turn-up and turn-down service requests resulting from subscribers moving into and out of the area. Service calls to the cross-connect cabinet are limited by administrative procedures that call for leaving cross-connects in place after service to a particular residence has been terminated.

The attributes of an urban cross-connect cabinet are that the service type is typically residential and small business, with some data processing and special circuits. These urban cabinets are located in a small geographical area having a much denser population; and the attached terminal boxes are usually of the 25 pair type. These boxes are closely spaced together or are located inside of urban buildings; one terminal appearance is provided for each distribution pair. A moderate to high level of service order activity is encountered in connection with the urban cross-connect cabinet. Also, in the urban setting, cross-connect boxes may be much more difficult to reach and service.

The attributes of a commercial or industrial cross-connect cabinet are that the service type is medium to large business, with a high concentration of special circuits These commercial/industrial cross-connect cabinets are located in a small to moderate geographical area, and they serve large outside terminal boxes, or boxes inside of buildings; with one terminal appearance per distribution cable pair. A high level of change activity is encountered, with many turn up/turn down requests, as well as fluctuations in cable pair requirements for each facility serviced. Predicting such requirements is particularly troublesome for the operating telephone company, as businesses move into, and expand and contract operations within business parks. While access to cross-connect cabinets in business parks is readily available, due to the high service order change activity, substantial labor expense has been typically incurred in manually modifying the cross-connections between feeders and distribution pairs at the cross-connect cabinet.

One representative and typical facilities management system, known as "facilities assignment control system" ("FACS"), has heretofore been employed by operating telephone companies in order to control and record cross-connect cabinet pair assignments. FACS provides for entry procedures, cross-connect assignment control (including central office jumper assignment procedures), and data base updating facilities. FACS updates the data bases that keep track of all cable pairs and central office jumpers so that other administrative programs, such as the "central office maintenance program", and "line maintenance program" may function as intended.

One regional operating company has determined that approximately forty eight percent (48%) of all subscriber service requests can be handled by the FACS or a similar assignment program. That is to say, FACS can assign cable pairs, designate cross-connects to be made (or reused if the cross-connect already exists) and assign a CO jumper. If a new cross-connect is required, FACS provides for generation of a work order calling for a telephone technician to travel to the cross-connect cabinet to install manually a new cross-connect. In the other fifty two percent (52%) of the cases, FACS cannot make a cable pair assignment (and there are many different reasons for this inability), in which case manual assistance is required Typically, a Line Assigner makes the cable pair assignment and enters the assignment back into FACS. FACS performs the rest of tee operation (cross-connect assignment CO jumper destination, work order generation) automatically.

Although some remote controlled automation of some telephone outside plant switching functions has been proposed for certain limited and dedicated tasks, such as feeder trunk switching, see for example, U.S. Pat. No. 4,520,234 entitled "Remote Cable Switching System", which patent is commonly owned with the present patent, no satisfactory solution to the problem of remote automatic switching of distribution pairs to feeder pairs at the cross-connect cabinet has heretofore been realized The problem becomes particularly more challenging when it is remembered that a distribution pair should be accessible by a plural tty of feeder pairs, in order to assure availability of a feeder pair for each distribution pair, even though typically there are many fewer feeder pairs than distribution pairs concentrated at the cross-connect cabinet.

A remotely actuated telephone instrument connection block having instrument lockout and test features is described in U.S. Pat. No. 4,434,328 to Gary C. Fields. While the invention described therein permitted an operator at the central office test board to conduct certain tests and to disconnect telephone service at the subscriber's premises, the remote line disconnect block was limited to a single subscriber and did not have any automatic access features.

In the preparation of this patent application, several other patents were considered in addition to the above-referenced U.S. Pat. Nos. 4,520,234 and 4,434,328. These other patents include U.S. Pat. Nos. 3,562,435 (Joel Jr.); 4,639,557 (Butler et al.); 3,822,367 (Humphrey); 4,076,970 (Lubarsky, Jr., et al.) 4,029,913 (Gunderson); 3,920,927 (Russel et al.); 2,981,804 (Abbot et al.) and 2,925,473 (Lucas).

The Joel Jr. patent proposed a teletypewriter controlled X-Y crossbar switch placed between outside plant feeder pairs and the main distribution frame within the central office as a replacement for the manually patched central office cross connects The Butler et al. patent describes a special test computer for testing e.g. special service or private line telephone circuits at a central office from a remote control point. The special computer includes both an analog bus and a digital bus. Voice synthesized error messages and frequency encoded communications means are stated aspects of the Butler et al. patent.

The Humphrey patent describes another line circuit testing arrangement for private lines. In this arrangement, a commercial telephone circuit from a main office becomes connected through a regional office to a private line extending to a local office of e.g. an insurance company. Impedances between the commercial lines and the private lines are equalized by the coupling units at the regional offices.

The Lubarsky Jr. et al. patent describes a telephone test system which uses a programmed microprocessor and a switching arrangement controlled by the microprocessor to select a particular telephone circuit and then connect it to a test port, thereby to enable tests to be conducted on that line via the test port.

The Gunderson patent describes a digital solid state telephone line test arrangement controlled from a remote control test center location. Extensive logic circuitry provides the test operator with considerable information regarding the condition of the circuit being tested.

The DeLuca patent provides a transition switch system for enabling telephone service subscribers to switch over from an older central office cross bar to a more modern electronic switch.

The Russel et al. patent describes an automatic switching arrangement within a private branch exchange which connects to any of a plurality of operator consoles. The arrangement enables the operator to connect a loop circuit to the trunk in a manner which enables the circuit so established to remain established while the operator console disconnects therefrom and is free to handle another service request. Thereafter, the operator console may reestablish connection to the established circuit, should that be desired.

The Abbott et al. patent describes a private branch exchange system which provides echelons of access to user circuits, some of which may have direct long distance calling access, and others of which have restricted access.

The Lucas patent describes a call concentrator which is preferably outside plant, located adjacent to the subscribers rather than within the central office environment. Time division multiplex is the preferred concentration technique.

With the ever increasing cost of service personnel labor, particularly travel time in the field, a hitherto unsolved need has arisen for automation of the manual cross-connection function between feeder and distribution pairs at the cross-connect cabinet.

SUMMARY OF THE INVENTION WITH OBJECTS

A general object of the present invention is to provide an electronic cross-connect cabinet which over-connect cabinets.

Another object of the present invention is to provide an outside plant telecommunications system which includes a plurality of electronic cross-connect cabinets located remotely from a central office, and to provide an electronic supervisor at the central office location for supervising automatic switching operations at a selected one of the plurality of electronic cross-connect cabinets.

A further specific object of the present invention is to provide an electronic cross-connect cabinet which receives all operating power and switching instructions from a central office supervisor during a switching interval, which acts upon the switching instructions to locate a switch module and a latching relay thereof, to test the operation of the switch module, test the connection to the selected latching relay and only when the tests confirm proper connection to activate the selected latching relay.

One more specific object of the present invention is to provide an electronic cross-connect cabinet with redundant control and test features in order to minimize maintenance and ensure reliable operation over an extended service life and over harsh environmental conditions.

One more specific object of the present invention is to provide a remote cable pair cross-connect system which is normally in a non-powered, quiescent state, and which upon being selectively powered is capable of automatically installing a remote, outside plant cross-connection by selecting a particular cross-connect cabinet and line card, and by selectively sending power and signalling sequences to the selected cabinet and card, without sending power to any other part of the system during a cross-connect automatic switching interval Yet another object of the present invention is to provide a remote cable pair cross-connect system which employs a heirarchy of controllers in order automatically to select, apply power to and switch a bi-stable switching relay of a switch matrix in order to achieve a cross-connection remotely located from the highest order control point.

In accordance with the principles of the present invention an electronic cross-connect cabinet is provided for use within a telecommunications system outside plant facility characterized by a multiplicity of communications path feeder pairs leading from a main distribution frame at a central office to subscriber locations via feeder cables extending to a plurality of cross-connect cabinets located remotely from the central office, and distribution cables of distribution pairs leading from terminal blocks adjacent to subscriber locations to the cross-connect cabinets, and further including central office supervisory equipment located at the central office.

The electronic cross-connect cabinet includes a backplane for terminating all of the feeder pairs and all of the distribution pairs; a control pair leading from the central office supervisory equipment to the backplane via a feeder cable terminating thereat; and, an electromechanical switching matrix comprising an array of switching relay modules. Each module also contains an array of latching relays, each for selectively connecting and disconnecting a selected feeder pair to a selected one of a plurality of distribution pairs. Each module further includes control circuitry for locating and actuating one of the latching relays.

An electronic cabinet controller is connected to the backplane and it locates, powers and operates a selected one of the electromechanical switching matrix modules and further locates and operates the selected latching relay of the selected switching matrix module. The electronic control means receives all of its required power and switching information from the central office supervisory equipment via the control pair and returns status information to the central office supervisory equipment via the same control pair. Various test and verification conditions are established at the cross-connect cabinet during a switching interval.

These, and other objects, advantages and features of the present invention will be more fully appreciated and understood by considering the following detailed description of a preferred embodiment, presented in conjunction with the accompanying drawings.

BRIEF DESCRIPTION OF THE DRAWINGS

In the Drawings:

FIGS. 6D and 6E are a schematic circuit diagram of relay driver circuitry of each one of the switch matrix modules within the electronic cross-connect cabinet unit as illustrated in FIG. 1.

DETAILED DESCRIPTION OF A PREFERRED EMBODIMENT

Figure 1:
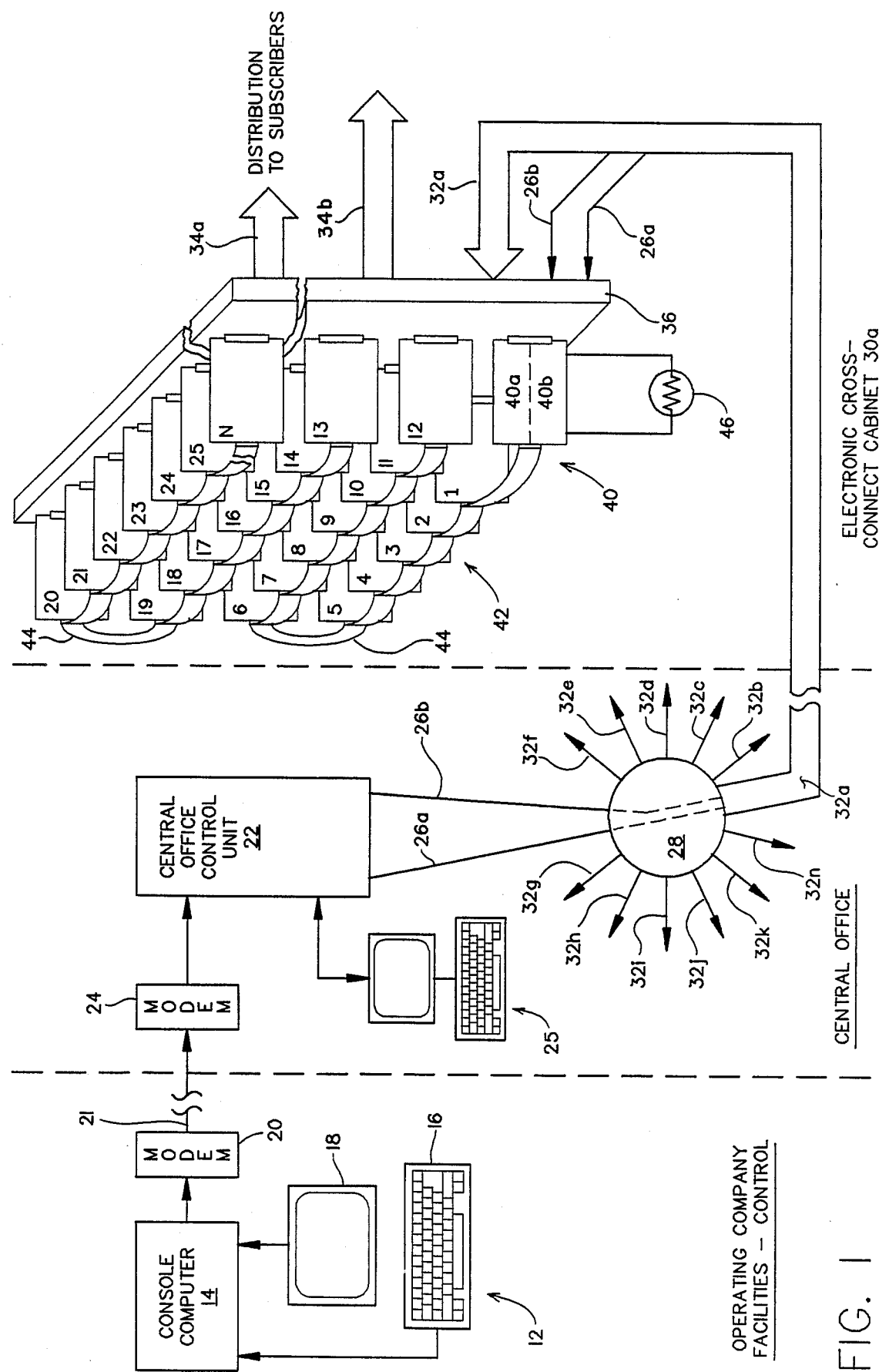
FIG. 1 is a generalized overall system block diagram of a remote cable pair cross connect system incorporating the principles of the present invention.

A remotely controlled electronic cable pair cross-connect system 10 is illustrated in the FIG. 1 overall system block diagram. Therein, the system 10 i seen to include three categories of structural and functional subsystems: at the highest level, a system control facility 12; at least one central office supervisory control unit 22; and, at least one electronic cross-connect cabinet 30.

The system control facility 12 includes, by way of example, a suitably configured console computer 14 having e.g. a terminal keyboard 16, video display monitor 18 and modem 20 located and operated, for example, at a telephone operating company business office or subscriber service operations and maintenance facility. The console computer 14 may be a programmed personal computer, such as an IBM Personal Computer (tm) having both internal, floppy disk and fixed disk data storage capability. The console computer 14 functions to communicate cross-connect switching information to a selected central office supervisory control unit 22 via a dial up telephone line. It also maintains a data base of information relating to present and planned cross-connect cabinet activity. An internal, battery backed up, real time clock enables cross-connect switching operations to be scheduled for and carried out at a subsequent date and time automatically without operator intervention.

Each central office supervisory control unit 22 includes a modem 24 and e.g. dedicated control pairs 26a and 26b which are routed through a conventional main distribution frame 28 which interconnects central office switching equipment with outside plant wire pair facilities. The supervisory control unit 22 receives cross-connect switching information from a remote control point, such as the computer 12 at the central control location, via a dial-up telephone line and its own modem 24; and the supervisory control unit 22 converts this information into a series of dual tone multifrequency (DTMF) command sequences which are sent to the specified electronic cross-connect cabinet 30 to which the control unit 22 is connected by th dedicated wire pair 26.

Local manual control of tee supervisory control unit 22 may be achieved by providing a local RS232 serial port terminal console 25 which enables technical personnel at the central office location of the unit 22 to load initial, default or updated values and programs, and to carry out diagnostics routines during maintenance sessions.

The control unit 22 also supplies suitable operating current to the selected cross-connect cabinet 30 over the dedicated wire pair 26 during the cross-connect command operational interval. During this interval, the control unit may receive dual tone multi-frequency ("DTMF") status values from the selected cabinet 30.

Although only one cross-connect cabinet 30a is shown in FIG. 1, it is to be understood that it is representative of a plurality of such cabinets 30 capable of being included within the system 10 and supervised by a single control it 22. A feeder trunk 32a is one of many such trunks 32a-n extending from the main distribution frame 28 of the central office to outside plant distribution locations, including the electronic cross-connect cabinet 30a. The feeder trunk 32a terminates its pairs at termination connections on a backplane 36 of th electronic cross-connect cabinet 30a. Distribution trunks 34a and 34b extend from termination connections on the backplane 36 of the electronic cross-connect cabinet 30a to terminal boxes located adjacent to service subscriber premises. Service drops extend from the terminal boxes to the subscribers' locations in conventional fashion in order to complete each separate telecommunications pair path. While feeder cables, such as the trunk 32a, may contain any appropriate number of wire pairs, 300 pairs are typically contained in such cable, and it is typically pressurized with dry air or inert gas to reduce losses otherwise resulting from moisture intrusion. The distribution trunks 34a and 34b also may be of any convenient size, although 300 pairs per trunk is nominal. In the cabinet 30a there are 300 feeder pairs and 600 distribution pairs, for example.

In order to provide for fail-safe backup, each electronic cross-connect cabinet 30 includes one plug-in dual controller card 40, having two independent controllers 40A and 40B provided thereon. The cabinet also includes a multiplicity of plug-in switch matrix cards 42-1 through 42-n, there being 60 such cards in the preferred embodiment hereof. Each switch matrix card 42 is identical with every other switch matrix card 42. The unique identifier for each cabinet 30 and switch matrix card 42 is established by an identifier programming field present at the backplane 36. Thus, the cards 40 and 42 become uniquely identified electrically by their particular plug-in locations on the backplane 36.

Each controller card 40 is connected to the central office control unit 22 via the dedicated control pairs 26. In the present example, the controller 40A is connected to the control unit 22 via the pair 26a; and the controller 40B is connected to the control unit 22 via the pair 26b. The dual controllers 40A and 40B are redundant; that is to say, each serves as a backup for the other; and, the central office control unit 22 has the option o accessing either the controller 40A or the controller 40B. The first controller 40A or 40B within a cabinet 30 to be activated captures the internal control buses and contacts of a relay K1 which locks out the other controller during a switching command interval. Lockout occurs by switching the control pair for the locked out controller, e.g. The pair 26b to the controller 40B, over to an external test port of the active controller, e.g. an external test port 47a of the controller 40A. This pair 26b may then be accessed and used by test board equipment located at the central office during th switching interval to test any feeder pair and or switched feeder/distribution combination at the cross-connect cabinet, selected by the central office supervisory control unit 22. After the switching interval is completed, the contacts of relay K1 disconnect the standby control pair 26b from the test port 47a and reestablish connection to the control unit 40B.

Figure 3:
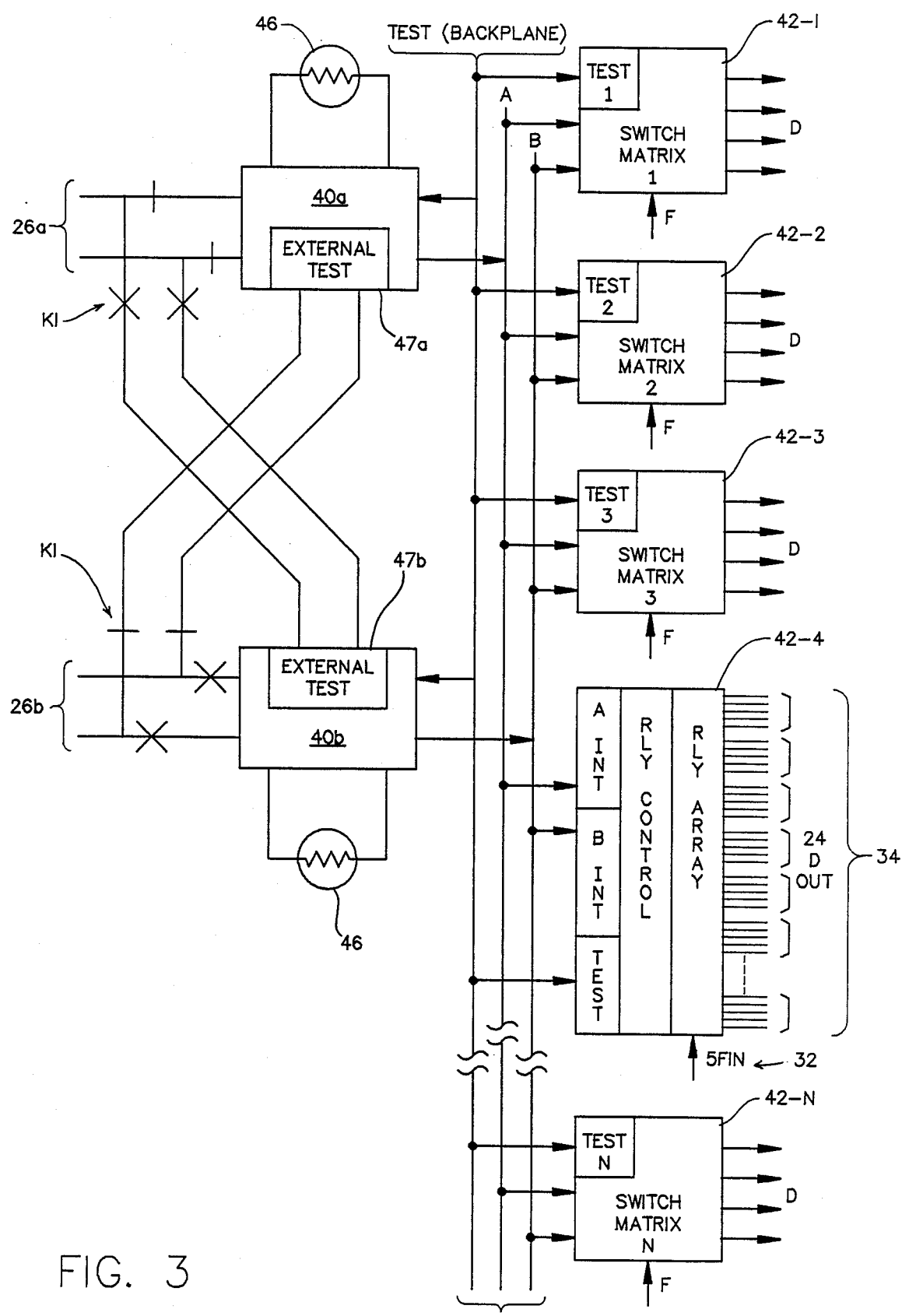
FIG. 3 is a more detailed block diagram of the electronic cross-connect cabinet unit as illustrated in FIG. 1.

A fifty wire, flat ribbon control cable 44 plugs into the controller card 40 and each of the switch matrix cards 42 within the cabinet 30. The cable 44 contains separate address, control and power buses for the two controllers 40A and 40B, (FIG. 3). Since there are so many switch matrix cards 42 in the system, it is not feasible to supply power to all of them during a switching interval. Thus, during the interval, only the switch matrix card having the switch location sought to be accessed is supplied with power. This selective energization of but one switch matrix card also reduces the likelihood that any switch other than the intended one will actually become energized during the switching interval. Thus, all power and switching commands are supplied via the cable 44 to locate and operate the designated switch matrix card 42, and status and test condition information is returned from the designated switch matrix card 42 to the active controller card 40 via this cable 44.

All power and operating commands required for operation of the electronic cross-connect cabinet 30 during a switching command interval are provided over the dedicated pair 26 to which the activated controller 40A or 40B is attached. The electronic cross-connect cabinet may be remotely controlled by the central office control unit 22 in order to carry out predetermined tests on a selected feeder pair and/or feeder pair-distribution pair combination at the cabinet 30. Other than during a switching command interval, the selected electronic cross-connect cabinet remains in an unpowered, quiescent state. Only the selected cabinet 30 receives power and switching command sequences during a switching interval and as presently configured, the control unit 22 operates only one of its attached electronic cabinets 30 during a single switching interval. Each controller unit 40 may be provided with an environmental sensor, such as a temperature sensor 46, so that environmental conditions at and within the cabinet location may be remotely monitored. the electronic cross-connect cabinet may be housed within a conventional weatherized metal or fiber-reinforced polyester resin housing, such as a Krone Cross-Connection Cabinet originally intended for LSA-PLUS manual cross-connection modules, supplied by Krone, Inc., 6950 South Tucson Way, Suite R, Englewood, Colo. 80112. Also, the electronic cross-connect cabinet 30 may be included within a telecommunications equipment room or vault of a large office, housing, shopping or manufacturing building or complex.

CROSS-CONNECT CONSOLE COMPUTER 14

The activity within the telephone operating company having responsibility for assigning cross-connects, updating outside plant facilities and subscriber service data bases, and generating work orders to make and change cross-connects has remote direct access to each electronic cross-connect cabinet 30 via the console computer 14 and the control unit 22 associated with the particular cross-connect cabinet 30 of present interest.

An outside plant facilities data base maintained within, or accessible to, the console computer 14 enables cross-connects to be assigned automatically, once a subscriber's premises is identified. Once a distribution pair is identified by a customer service representative, the cross-connection path through the appropriate cross connect cabinet 30 and central office is automatically determined by the computer 14 under program control in conjunction with the facilities data base. Feeder pairs within a selected feeder cable 32 are assigned in accordance with a predetermined arrangement. Thus, the computer 14 looks for the best available feeder pair in accordance with conventional practice and the constraints of the switching matrix.

The operator of the console computer has the capability of overriding any automatic feeder pair assignment, and may remove a particular feeder pair from service in the event that it is determined to be of marginal quality or is defective, or is utilized elsewhere.

The console computer software control system enables the operator to obtain operational instructions from a HELP menu by selecting a predetermined function key, such as F1, at the keyboard 16.

A CONNECT command automatically causes the console computer to dial up a central office control unit 22 specified by the operator. This control connection is made automatically by the console computer 14 via its modem 20, telephone line 21, and the modem 24 of the specified control unit 22.

A SELECT command enables the console computer operator to select a particular electronic cross-connect cabinet in which work is to be done. When this command is given, together with a cabinet identifier, the central office control unit 22 activates the designated cabinet 30 via the control pair 26 and then verifies that the proper cabinet 30 has been accessed and powered up during what is now a switching command interval.

A SEE command enables the console operator to view a map of the current cross-connects of the selected cabinet 30, thereby finding out which feeder and/or distribution pairs are presently in use, and what the percentage of present utilization of the selected cabinet 30 is. This information is provided to the operator from a connection map maintained for the particular cabinet by its control unit 22 in non-volatile memory, such as electrically erasable, programmable read only memory (EEPROM). With non-volatile memory at the control unit 22, power interruptions or outages will not destroy the connection map. A system-wide facilities connection map may also be maintained by, or accessed by, the console computer 14; and such map is automatically updated by the console computer 14 to reflect any cross-connect switching that has occurred during a switching interval.

A SET-UP command enables the operator to set up a new cross-connect within the specified cabinet 30. That is to say, when an unused distribution pair is identified, either by being entered by the operator or by being automatically specified to the operator by the console computer 14, it will then assign a feeder pair, or a pair of feeders in case of a four wire circuit, and will command the central office control unit 22 when to carry out the cross-connect switching operation, if it is not to be carried out presently. This command also enables the operator to remove a preexisting cross-connect presently, or at a suitable future date and time.

A MODIFY command enables the operator to modify an earlier set up command so as to change the date or time of the actual cross-connect switching operation, or to cancel it. In area of significant subscriber service demand automatic remote disconnection of a feeder pair from a no-longer-needed distribution pair frees up the feeder pair for assignment to a subsequent subscriber, thereby expanding the capability of the automated electronic cross-connect cabinet facilities 30 of the system 10.

A SYSTEM command enables an operator (typically the system administrator) to perform diagnostics, control operator access to the system, and update the system concerning new or changed electronic cross-connect cabinet facilities.

Central Office Cross-Connect Control Unit 22

Figure 2:
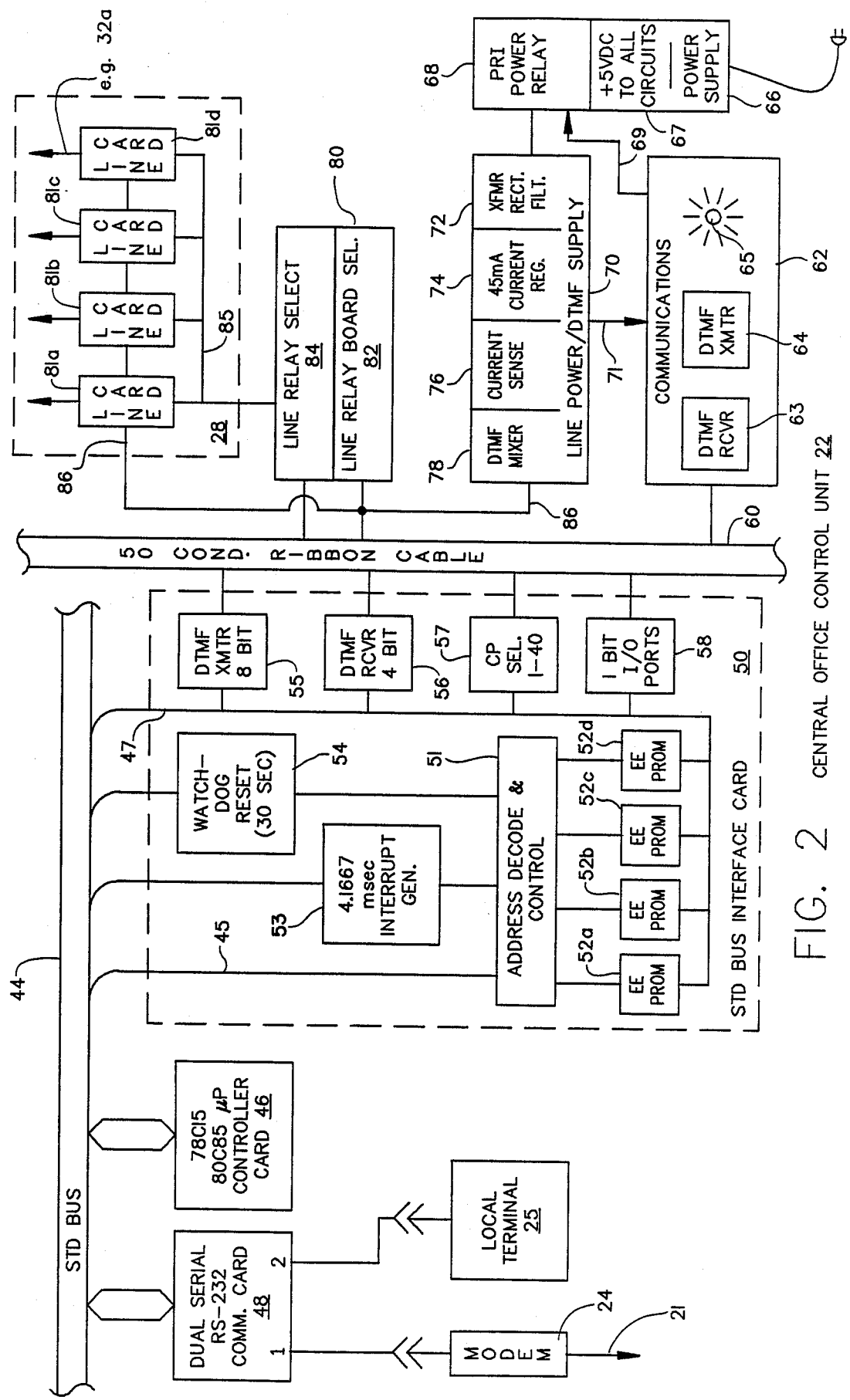
FIG. 2 is a more detailed block diagram of a central office remote cross, connect supervisory control unit subsystem as illustrated in FIG. 1.

The central office cross-connect supervisory control unit 22 is a self contained unit installed at the central office location. As shown in FIG. 2, the unit includes a digital controller portion which is implemented with the STD Bus (tm) format as defined by Prolog Corporation, and includes a STD bus 44 structure provided by plug-in backplane wiring in a card cage. Several standard plug-in card units are provided, including a 78C15 microprocessor controller card which includes an 80C85 microprocessor, up to 24 KBytes of erasable programmable read only memory (EPROM) containing a control program, and 8 KBytes of random access memory (RAM).

A dual serial input/output card 48 is also provided for plug-in attachment to the STD Bus 44. This card 48 provides two RS-232 serial interface ports for connection to the modem 24, which may be a Hayes 1200 modem, or equivalent, and for connection to the local terminal 25. The console computer 14 accesses the particular supervisory control unit 22 at a particular central office remote from the location of the console computer 14 through its dial-up modem 20, and the telephone line 21 which is part of the telephone network switching system.

A STD bus interface card 50 includes numerous functions and is specially adapted for use in the present remote cross-connect system. Basically, the card 50 provides a bridge connection between the SDD bus 44 and the access, power and control section of the supervisory unit 22, to be described hereinafter.

There are four separately addressed units 52a, 52b, 52c and 52d of eight kilobyte electrically erasable programmable read only memory (EEPROM) located on the interface card 50. Each unit 52 is addressed by an address decode and control logic block 51 which decodes address bytes in order to locate information stored in the EEPROM array 52. This memory array 52 is provided to record the set position of each switch of every cross-connect cabinet 30 under direct supervision of the particular supervisory unit 22. The EEPROM array 52 also contains the list of legitimate console computer telephone numbers, supervisory unit identification information, and user information including names and access codes.

A 4.16667 millisecond interrupt generator 53 is included on the interface card 50 and it generates an interrupt clocking signal every 4.16667 milliseconds. All activities handled within th supervisory unit 22 which must be handled in a timely manner, such as communications activities, are handled in the timed interrupt routine.

A watchdog timer 54 is provided on the interface card 50 in order to reset the local control microprocessor on the card 46 if the timer 54 is not cleared at least once every thirty seconds. Since the supervisory unit 22 is not generally directly accessible to the user (who is typically located at or in conjunction with the console computer 14), the reset function provided by the watchdog timer 54 is required to ensure that the local microprocessor controller card 46 is at least allowed to restart after it has been put in a state that keeps it from performing normal functions.

An eight bit DTMF transmit path 55 enables digital control data generated at the controller card 46 to be converted into DTMF sequences ultimately for transmission to a selected cross-connect cabinet 30 via a DTMF transmitter 64 located on a communications card 62 in the control unit 22. A four bit DTMF receive path 56 receives data from a selected cross-connect cabinet which has been decoded from DTMF by a DTMF receiver 63 on the communications card 62.

There are a number of specialized control lines serviced by the interface card. These lines extend through a fifty conductor ribbon cable 60 to other cards of the supervisory unit 22. These lines include the following: A control pair select signal data port 57 enables the control unit 46 to select one of up to forty control pairs, there being two pairs per cabinet, thereby selecting one cross-connect cabinet 30 of those directly supervised by the unit 22 to be active during a switching interval. A control pair current enable line 69 active, turns on the power supply supplying current to the selected cross-connect cabinet 30. A lamp line, when active, turns on a utility amp 65 on the communications card 62 which may indicate that a switching interval is presently occurring or any other condition as may be desired to be signalled visually at the supervisory unit 22. An inhibit receive line, when active, disables the DTMF receiver 63 from a cross connect cabinet 30 in order to prevent signals originating at the supervisory unit 22 to be misinterpreted as having originated at the cross-connect cabinet. A receive digit valid line, when active, indicates that a digit has been received from the selected cross-connect cabinet 30; and, a control pair current sense line, when active, indicates that current is flowing in the selected control pair to the selected cross-connect cabinet.

As mentioned, the communications card 62 includes the DTMF receiver 63, the DTMF transmitter 64 and the signal lamp 65. DTMF transmission is initiated by setting the eight bit signal word into the DTMF transmitter 64 which converts the digital value into a DTMF signal which is sent to the selected cross-connect cabinet 30. DTMF reception is automatically carried out by the DTMF receiver 63 long as the inhibit DTMF receive signal is inactive. When a digit is received, the received digit valid line becomes active and remains s for the duration of the digit plus an additional approximately 10 msec. period after the digit interval is over. When the supervisory unit 22 is transmitting DTMF control tone sequences to the selected cross-connect cabinet, the inhibit line is normally active.

As a matter of convenience, the control pair current enable 69 and control pair current sense line 71 are routed through the communications card 62 and bus 60 to the interface card 50, since the line power supply card 70 does no directly attach to the 50 conductor ribbon cable 60.

A line select card 80 includes line relay board decode circuitry 82 to select a particular relay board and relay select circuitry 84 to select one of the relays located on the selected board. The switching matrix 28 preferably includes a series of line cards 81, such as the cards 81a, 81b, 81c, and 81d, which are operated by the line select card 80 to select a particular control pair 32 leading to a selected cross-connect cabinet 30, such as the pair 32a, shown in conjunction with the line card 81d in FIG. 2.

The line cards 81 include a series of relays, there being a separate relay for each cross-connect cabinet pair. Each relay includes a double pole, double throw contact set, with the normally closed contacts passing the incoming signal on to the next relay of the card or the first relay of the next card, and the normally open contacts leading to a particular control pair 32. Thus, when a particular relay is energized, it breaks the series connection to the relays following after it, and it passes the power and communication pat received from the relays before it to its particular control pair 32.

A line power/DTMF supply 70 supplies a regulated 45 milliamperes (mA) of DC current to the selected cross-connect cabinet 30. It also adds DTMF control signals to this current loop. To carry out its dual task, the supply 70 includes a 100 volt DC power supply unit 72, a 45 mA current regulator 74 which regulates the 100 volt DC output of the unit 72 to provide a constant current loop irrespective of distance (resistance loss) to the particular cross-connect cabinet 30. A current sense element 76 is included in the constant current loop in order to sense when current is flowing (i.e. The loop has been closed at the selected cross-connect cabinet). When current is sensed, the current sense control line, leading via the communications card 62 and the 50 conductor cable 60 to the interface card 50, becomes active.

A DTMF mixer transformer 78 adds the DTMF signalling sequences generated by the DTMF transmitter 64 of the communications card 62 to the current loop, and it also receives and separates DTMF tones from the cross-connect cabinet and sends them to the DTMF receiver 63. The combined loop current and DTMF signalling sequences are routed to the first relay of line card 1, 81A, over a signal line 86

A low voltage power supply 66 includes a +5 VDC low voltage power supply 67 for all of the logic circuit elements of the unit 22. It also includes a primary power switching relay which switches primary power to the 100 VDC power supply unit 72 of the supply 70 under control of the control pair current enable line 69.

The central office control unit 22, upon installation, is configured via the second, local RS 232 port of the communications card 48 and e.g. the local terminal 25. Users use this local terminal port to program the unit 22 with legitimate console computer call-back telephone numbers, i.e. what numbers the control unit 22 should dial back when a console computer 14 accesses the particular unit 22. This "legitimate phone number" list is maintained in the EEPROM 52 so that it remains intact during any power failures or power off conditions The local terminal port is also available to reset completely the supervisory unit 22, to retrieve certain error codes that relate to the modem 24, to examine memory locations within the unit 22, and to conduct diagnostics and test routines.

The access of the console computer 14 is by dial up calling through the telephone network to the local modem 24 which is attached to the first RS 232 port of the communications card 48. A "call up/call back" security procedure precedes any cross-connect activity: When the supervisory unit 22 answers the incoming call from the console computer, the unit 2 asks for the telephone number to call back the console computer. After the number has been communicated, the unit 22 hangs up. The unit 22 then compares the response with the "legitimate phone number" list. If the telephone number sent by the console computer 14 matches a legitimate number, the unit 22 initiates a call to the console commuter 14. If the telephone number received is not on the list, the unit 22 does nothing in response to the incoming call.

If the supervisory unit 22 calls back the computer console 14, cross-conncct activity can begin just as soon as the console computer answers. A cross-connect cabinet 30 supervised by the particular unit 22 is then physically selected, making that cabinet the object of the particular cross-connect control sequence.

At the completion of a cross-connect session, the console computer 14 commands the supervisory unit 22 to hang up. The unit 22 returns to a disconnected steady state, ready to receive the next computer access. As will be apparent to those skilled in the art, there may be a number of authorized console computers 14, and there are advantageously many supervisory units 22 throughout the central offices of the telephone system.

The following primitive commands are used by the supervisory unit 22 to perform cross-connection, test, and diagnostic functions within a cross-connect cabinet. To perform these functions the commands are used either individually or in groups.

A GET THE CABINET SERIAL NUMBER command retrieves the serial number and the cabinet configuration information from the selected cross-connect cabinet 30. The serial number is a six digit field followed by a two digit cross-connect cabinet configuration field.

A MAKE A CROSS-CONNECT command occurs when the selected cross-connect cabinet 30 is sent the number of the appropriate switch matrix card 42 and the relay number thereof and is instructed to actuate (set) the selected relay. The cross-connect cabinet 30 responds that the cross connection was successfully made, or that an error condition occurred.

A BREAK A CROSS-CONNECT command occurs when the cross-connect cabinet 30 is sent the number of the switch matrix card 42 and the relay number thereof and is instructed to release (reset) the selected relay. The cabinet 30 responds that the cross connection was successfully broken, or that an error condition occurred.

An ATTACH THE TEST BUS command occurs when the cross-connect cabinet 30 is sent the test source number (corresponding to an external test input, tip-rig short, tip-ground short, or ring-ground short) and is instructed to attach the given test source to the internal test bus 48 within the cabinet 30. (A particular feeder is attached to the internal test bus with a "Make Cross-Connect" command). The cabinet 30 response that the test source was successfully attached or that an error occurred.

A DETACH THE TEST BUS command occurs when the cross-connect cabinet is sent the test source number (corresponding to external test input, tip-ring short, top-ground short, or ring-ground short) and is instructed to detach the given test source from the internal test bus 48. (A particular feeder is detached from the internal test bus with a "Break Cross-Connect" command). The cross-connect cabinet responds that the test source was successfully detached, or that an error occurred.

A GET AN ANALOG TO DIGITAL CONVERSION VALUE command occurs when the cross-connect cabinet is commanded to read a particular analog value and report its value back to the supervisory unit 22. The cabinet can read the following analog voltages:
  2.5 Volt internal reference;
  Internal 6 volt supply voltage;
  Internal 8 volt supply voltage;
  Internal 30 volt supply voltage;
  Switch Matrix Card data bus bit 4 (for leakage tests);
  Temperature sensor (XXX.Y degrees Celsius-50 0);
  Switch Matrix Card 8 volt relay current (XX.YY V/3.0 ohm); and
  Switch Matrix Card 8 volt current during last relay actuation (XX.YY Volts/3.0 ohm).

When the supervisory unit 22 is detached from the console computer 14, the unit 22 maintains a real time clock so that it may perform pending cross connection/disconnection activity at the appropriate time, even though at that time the unit 22 is actually disconnected. At the date/time designated by the console computer 14 during a command sequence with the supervisory unit 22, the unit will initiate a command sequence with the selected cross-connect cabinet 30 and carry out the action requested. It then returns to a quiescent, steady state of inactivity.

The unit 22 constantly tests and monitors its modem 24 for proper configuration and response. If a problem is found, the supervisory unit first attempts to reset the modem and configure it properly. If the problem condition persists, an error message is delivered to the local terminal 25 via the second serial port of the card 48.

The supervisory unit 22 maintains a record of th cross-connect map for each of the electronic cross-connect cabinets 30 under its supervision; and it updates the map as changes are made at each relay of a supervised cross-connect cabinet. This connection map in nonvolatile memory may be transmitted to the console computer 14 upon request.

The supervisory unit 22 is somewhat similar to a control unit desoribed in the commonly owned U.S. Pat. No. 4,520,234, the disclosure thereof being incorporated herein by reference.

Electronic Cross-Connect Cabinet 30 Controller Board 40

Figure 4A:
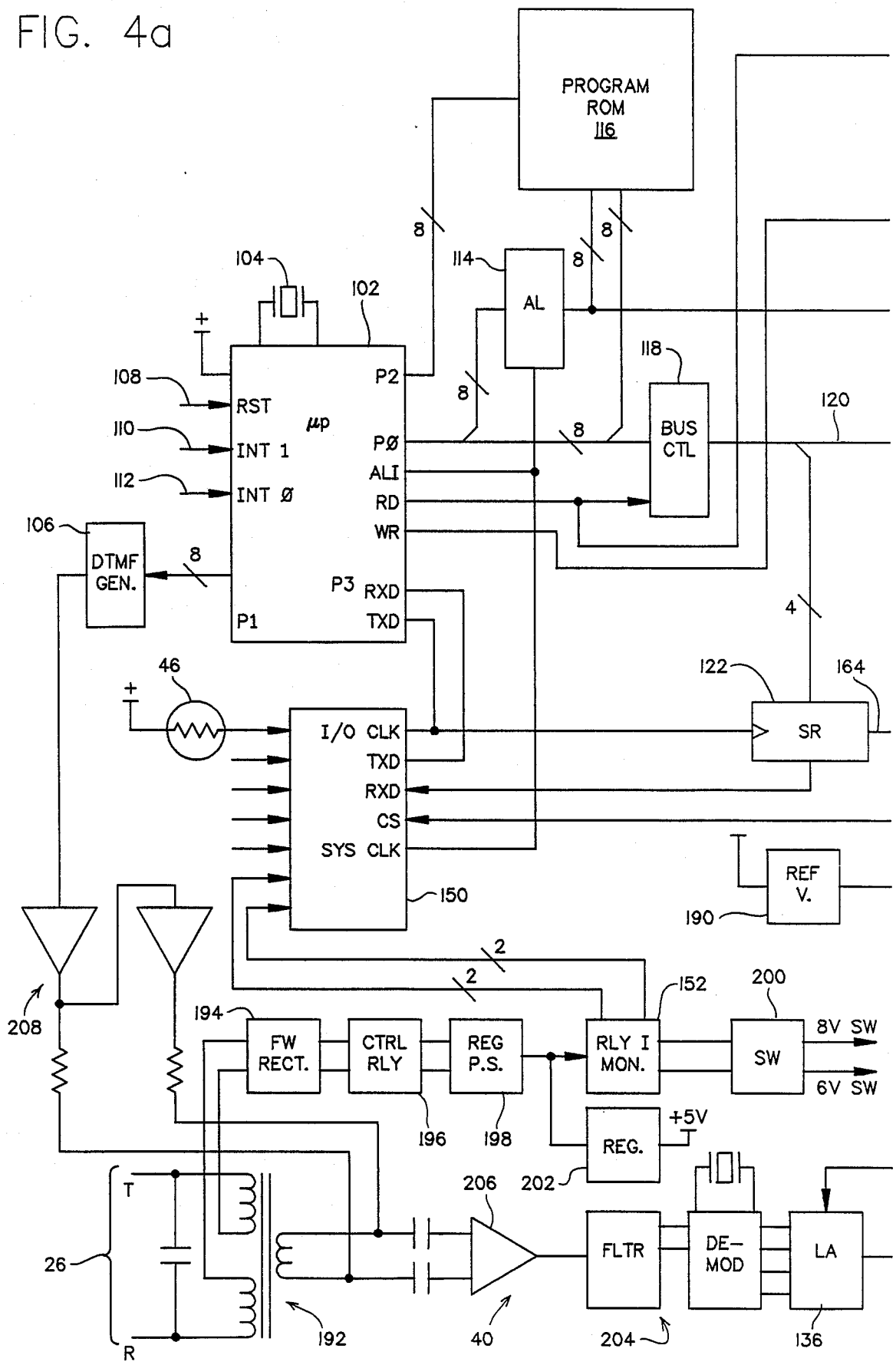
FIGS. 4a and 4b together form a detailed functional block diagram of one of the two identical supervisory controller modules provided within the electronic cross-connect cabinet unit as illustrated in FIG. 1.
Figure 4B:
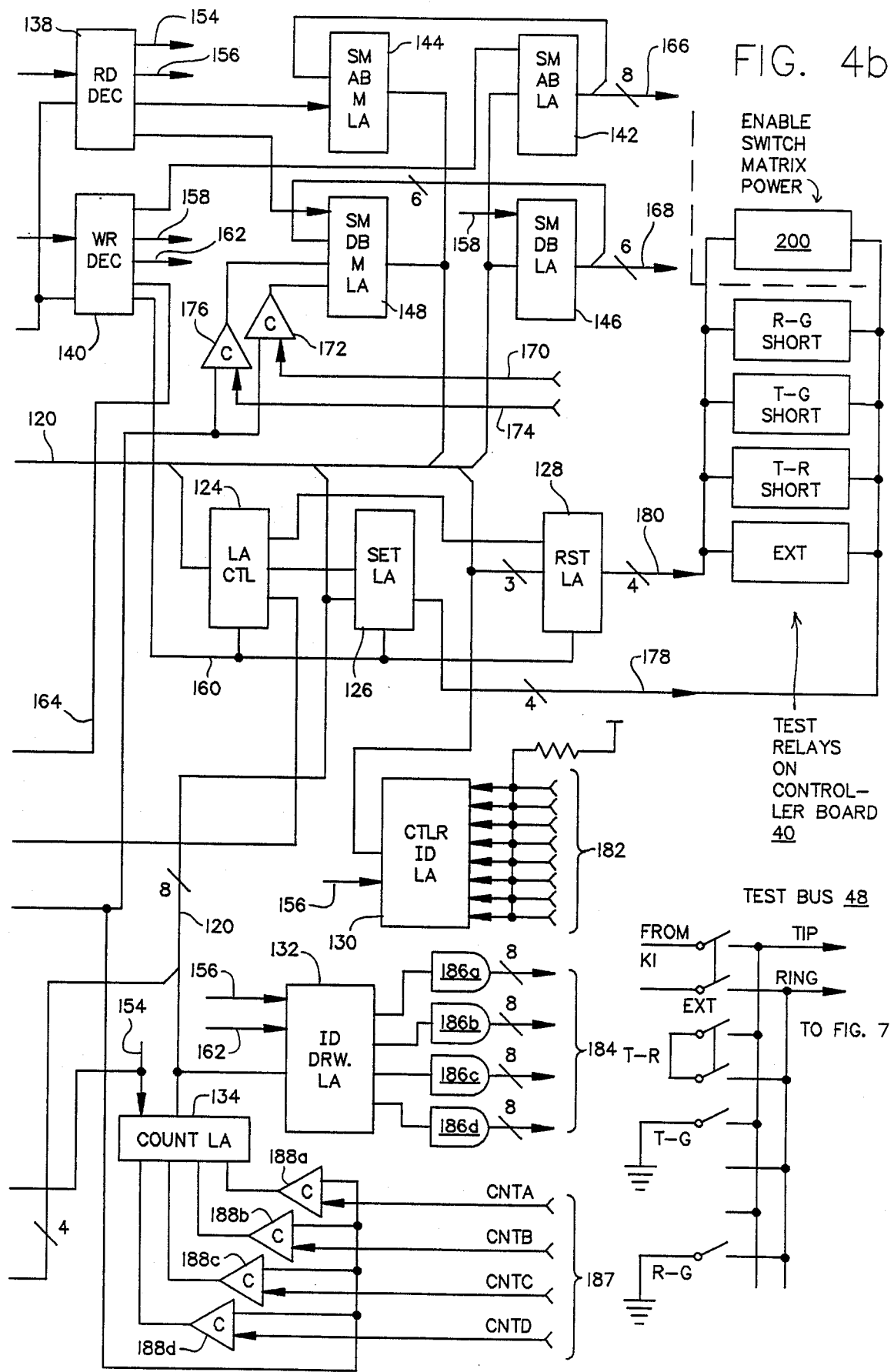

As seen in FIGS. 4a and 4b each identical controller module 40 includes a low power CMOS microprocessor 102, which has an internal clock locked to an external reference, such as the crystal 104. The microprocessor 102 may be the Intel type 80C31 and it includes four ports PO, P1, P2 and P3, of which P0 functions as an eight bit data/low order bits address port, P2 functions as an eight bit high order bits address bus, P1 functions as an eight bit output port for putting out commands to a DTMF tone generator 106, and P3 functions as a serial data transmit (TXD) and receive (RXD) port. The microprocessor 102 also has several control lines, such as a reset line 108, and two interrupt lines 110 and 112. An address latch enable line controls an address latch 114, so that low order address information on the P0 bus may be routed to address program memory 116 during an address cycle. Instructions are thereupon returned from the program memory 116 to the processor 102 over the P0 bus. A data bus controller 118 floats the data bus 120 which otherwise connects to the port P0 during external I/0 read and write cycles.

A number of control elements connect to the eight bit data bus 120, including a shift register 122, a latch control latch 124, a set latch 126, a reset latch 128, a controller board identification data latch 130, a controller board write identification data latch 132, a switch data response bus latch 134, a DTMF decoder latch 136, a switch module address bus latch 142, a switch module address bus monitor latch 144, a switch module data bus latch 146, ,and a switch module data bus monitor latch 148, all as shown in FIGS. 4a and 4b.

An analog to digital converter 150 having e.g. 11 multiplexed analog inputs is connected to supply serial data to the microprocessor 102. The analog inputs are connected to the thermistor 46, various supply voltage lines and to a relay current monitor circuit 152 within a controller board power supply to be described hereinafter. The shift register 122 provides serial address information to the analog to digital controller 150 to select the desired analog input.

The latch control latch 124 is used selectively to enable the set latch 126, the reset latch 128 and the analog to digital converter 150, as required by the control program stored within the read only program memory 116. The selective use of the data bus 120 is controlled by a read decoder 138 and a write decoder 140. The read decoder 138 selectively enables the switch data response bus latch 134 and the DTMF decoder latch 136 via a line 154, the read identification latch 130 and write identification latch 132 (during a read cycle) via a line 156, the switch module address bus monitor latch 144, and the switch module data bus monitor latch 148. The write decoder 140 selectively enables the switch module address bus latch 142, the switch module data bus latch 146 via a line 158. The write decoder 140 also loads the latch control latch 124, set latch 126 and reset latch 128 via a line 160; loads the write identification latch 132 via a line 162 during a write cycle; and loads the multiplexed analog input address into the shift register 122 via a line 164.

The set latch 126 and the reset latch 128 control the five latching relays on the controller 40. Four of these relays establish the state of the internal test bus routed to all of the switch matrix modules 42. The fifth relay 200 enables the switched power lines, 8 volt switched and 6 volt switched onto the 50 conductor ribbon cable 44.

The internal test bus can be established with a ring-ground short, a tip-ground short, a tip-ring short or attached to the external test source 47. Controlling the appropriate bit in the set latch 126 establishes a test condition, while in the same manner, controlling the same bit in the reset latch 128 removes the particular test condition. In a like manner the 8 volt and the 6 volt power lines are switched on and off via control of the set latch 126 and the reset latch 128.

An eight bit line controller board identification bus 182 provides cross-connect cabinet 30 identifier information to the controller board identification latch 130. The backplane identification jumper field of the particular cross-connect cabinet 30 is energized via a 32 bit bus 184 extending from four selected drivers 186a, 186b, 186c and 186d, as selected by the write identification latch 132. In this manner, the electrical identity of the particular cross-connect cabinet 30 may be ascertained from the backplane 36 and relayed to the central office supervisory unit 22 as a check that the proper cross-connect cabinet is attached to the activated control pair 26.

The following buses and lines extend to all of the switch matrix modules 42 via the 50 line ribbon 44:

An eight bit switch address bus 166 extends from the output of the switch module address latch 142 and feeds back to provide an input to the switch module address bus monitor latch 144, so that the address put out on the address bus 166 during a write switch address cycle may be monitored by the processor 102 during a read cycle. A six bit switch data bus 168 extends from the output of the switch module data latch 146 and feeds back to provide an input to the switch module data bus monitor latch 148, so that the data put out on the data bus 168 during a write switch data cycle may be monitored during a read cycle. A switch matrix response line 170 passes through a comparator 172 to an input of the switch module data bus monitor latch 148. A switch enable line 174 also passes through a comparator 176 to an input of the latch 148.

Count data from a selected switch module 42 comes back to the controller board 40 via a count bus 187 comprising four count lines, CNTA, CNTB, CNTC and CNTD. This data passes through four comparators 188a, 188b, 188c and 188d to inputs of the switch module data response latch 134 whereupon it may be placed on the data bus 120 and read by the microprocessor 102. A reference voltage is supplied to the comparators 172, 176 and 188a-d by a suitable reference supply circuit 190.

Finally, two voltage lines, an 8-volt switch line, and a 6-volt switch line extend from the controller card 40 to each of the switch matrix modules 42 via the cable 44. All other connections are made via the backplane 36.

A tip and ring control pair 26 enters the controller board 40 at an isolation transformer 192. Power supply voltage provided from a 45 milliampere central office current loop is separated from DTMF signalling sequences by the transformer 192. The direct current loop from the transformer 192 extends to a full wave rectifier 194, thence through a relay control circuit 196 for controlling the K1 relay, and thence to an internal isolation and step down voltage switching converter and regulator power supply 198. The power supply 198 generates the 8 volt and 6 volt supplies which are distributed throughout the controller 40. A relay switching network 200 under the control of the set and reset latches (set power and reset power lines) controls application of the 8 volt and 6 volt supplies throughout the cabinet 30. The +5 volt regulator 202 distributes suitable supply voltage to operate the circuitry of the controller card 40. All of the logical elements depicted in FIG. 4 are preferably low power CMOS integrated circuits DTMF command and data signalling sequences sent via the central office controller unit 22 during a switching interval are detected by a DTMF detector circuit 204 which may be conventionally formed of a touch tone filter circuit GTE type 8865, and a crystal controlled touch tone decoder circuit, GTE type 8860, as shown in greater detail in the earlier referenced U.S. Pat. No. 4,520,234. Each decoded DTMF hexadecimal value is loaded into the DTMF latch 136 and may thereupon be obtained and processed by the microprocessor 102. Amplifier circuitry 206 establishes proper operating levels for the decoder circuit 204.

As already mentioned cross-connect cabinet status and test condition values are sent by the microprocessor to the DTMF generator 106 via the port P1. The DTMF generator 106 may be an integrated circuit type S25089. Suitable amplifier circuitry 208 balances the DTMF output into the transformer 192.

Switch Matrix Module 42

Figure 5:
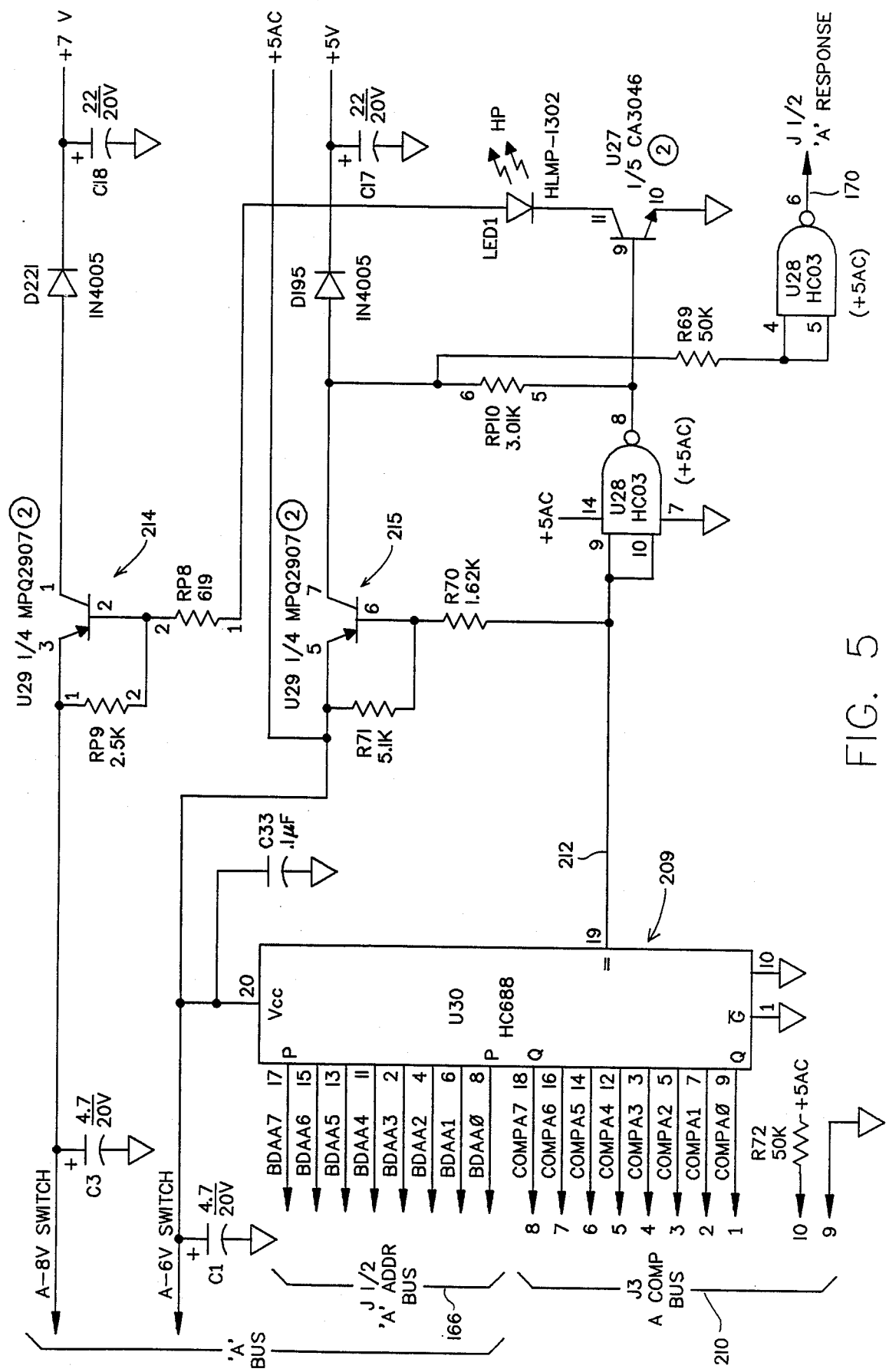
FIG. 5 is a schematic circuit diagram of one of the two identical switch matrix bus identification and power switching portions of one of the e.g. 60 switch matrix modules contained within the electronic cross-connect cabinet unit as illustrated, in FIG. 1.

The circuitry by which a particular switch matrix module 42 is located is shown in FIG. 5. Therein, a comparator array 209 has eight inputs connected to the switch module address bus 166, an has eight inputs connected to a backplane jumper field 210 which is unique for each switch matrix module 42 and which thereby establishes the electrical identity thereof. There are two FIG. 5 circuits on each switch matrix module 42, one for the A controller buses and one for the B controller buses. Only the circuit corresponding to the active controller is actually turned on during a switching interval.

All 60 of the comparator arrays 209 of all of the switch modules 42 in the cabinet 30 are activated during a switching interval so that the desired switch module may be identified. If the data pattern on the address bus 166 matches the backplane jumper field 210, the comparator array U30 has an output line 212 which becomes active. When this condition occurs, a matrix board response signal is returned to the controller via the line 170. This particular line acts as a check that matrix module 42 has been identified. At the same time two transistor switches 214 and 215 turn on so as to supply power from the 6 volt and 8 volt switch power lines to power up other circuitry of the selected module 42.

Figure 6A:
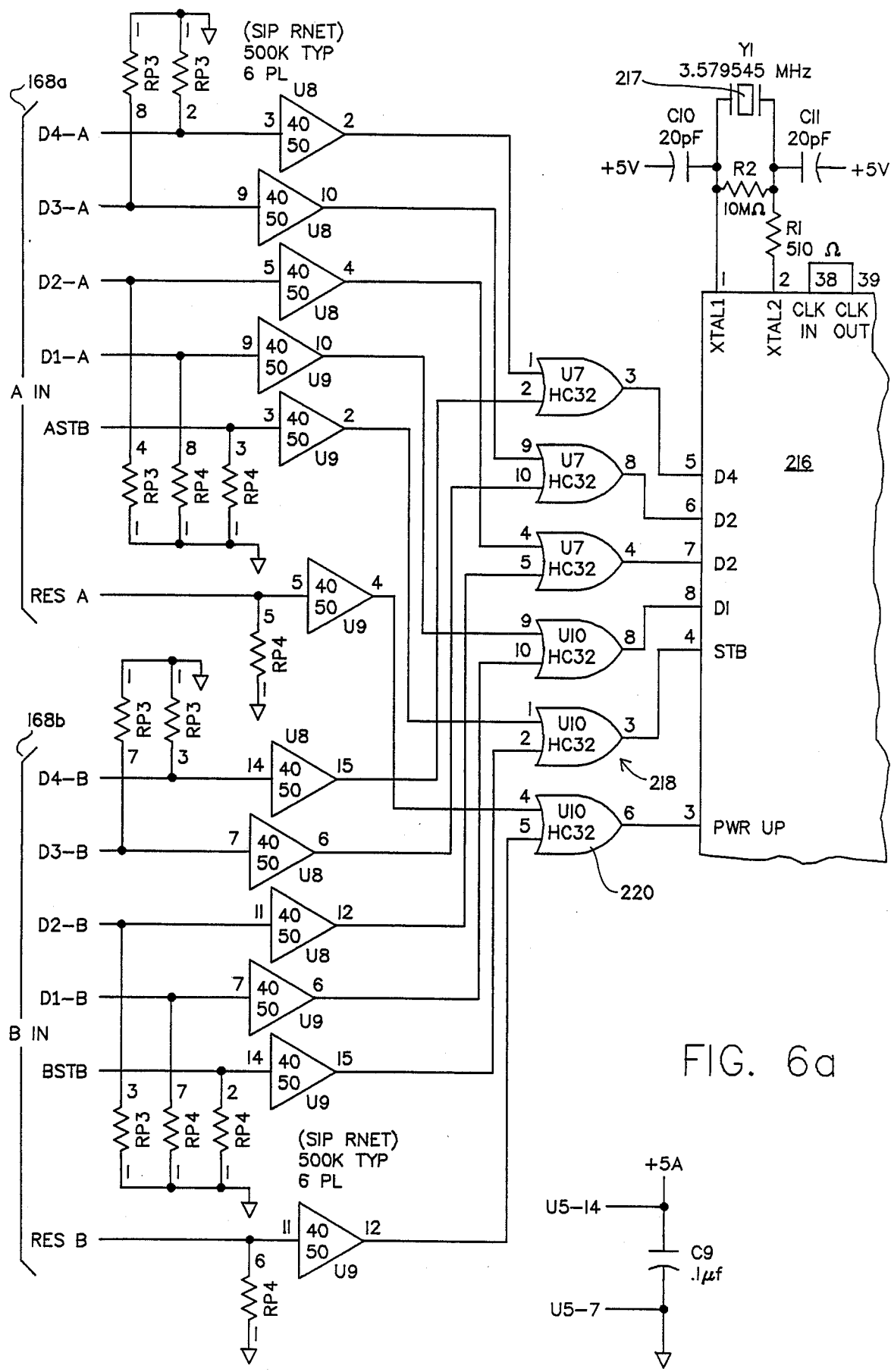
FIGS. 6A and 6E together form a schematic circuit daagram of the bus interface circuitry of each one of the switch matrix modules within the electronic cross-connect cabinet unit as illustrated in FIG. 1.
Figures 6B, 6C:
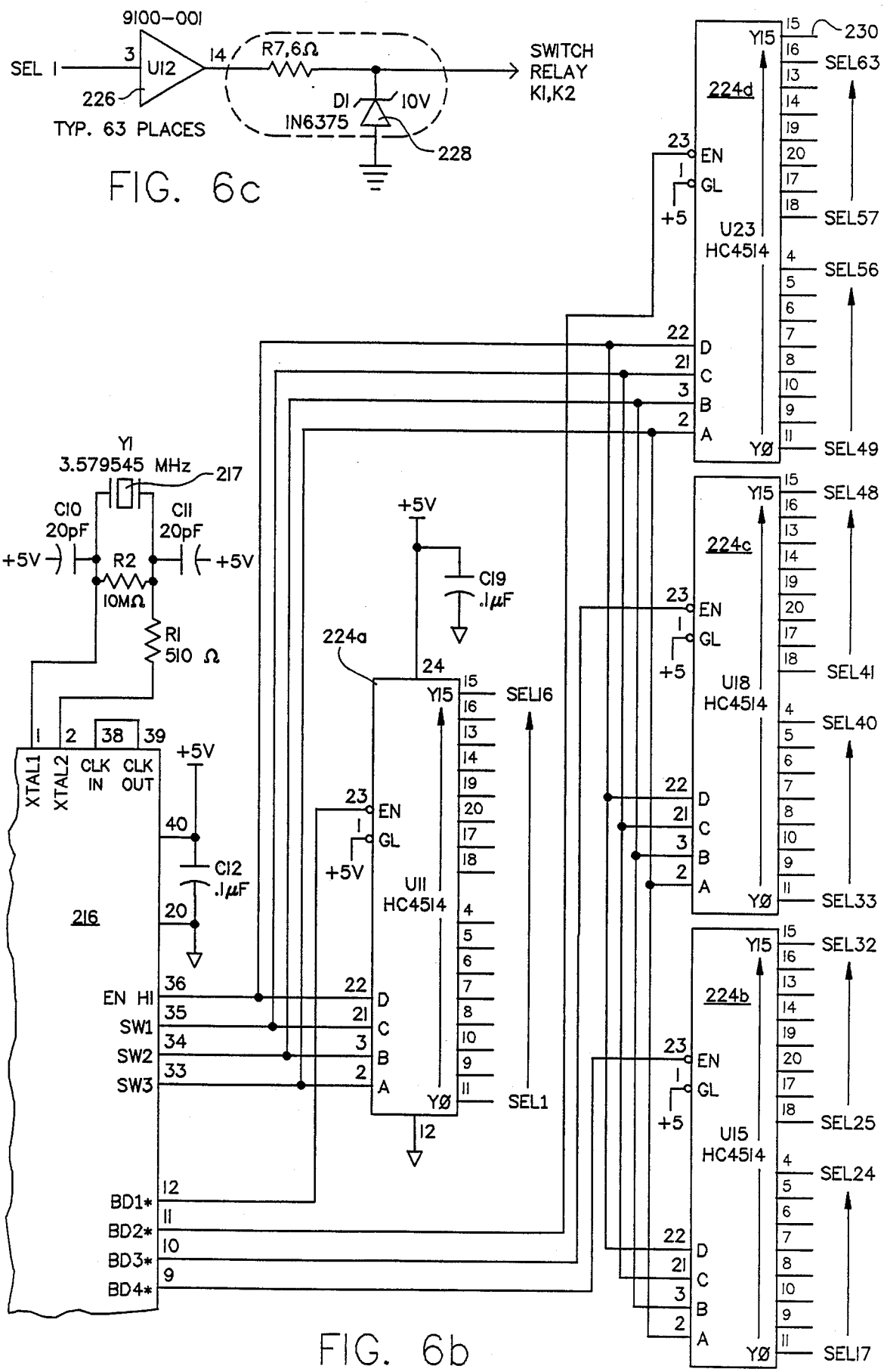
FIG. 6B is a schematic circuit diagram of relay selection decode circuitry of each one of the switch matrix modules within the electronic cross-connect cabinet unit as illustrated in FIG. 1.
FIG. 6C is a block and schematic circuit diagram of a representative relay driver and overvoltage protection circuit provided for each pair of bistable relays within a switch matrix board.
Figure 6D:
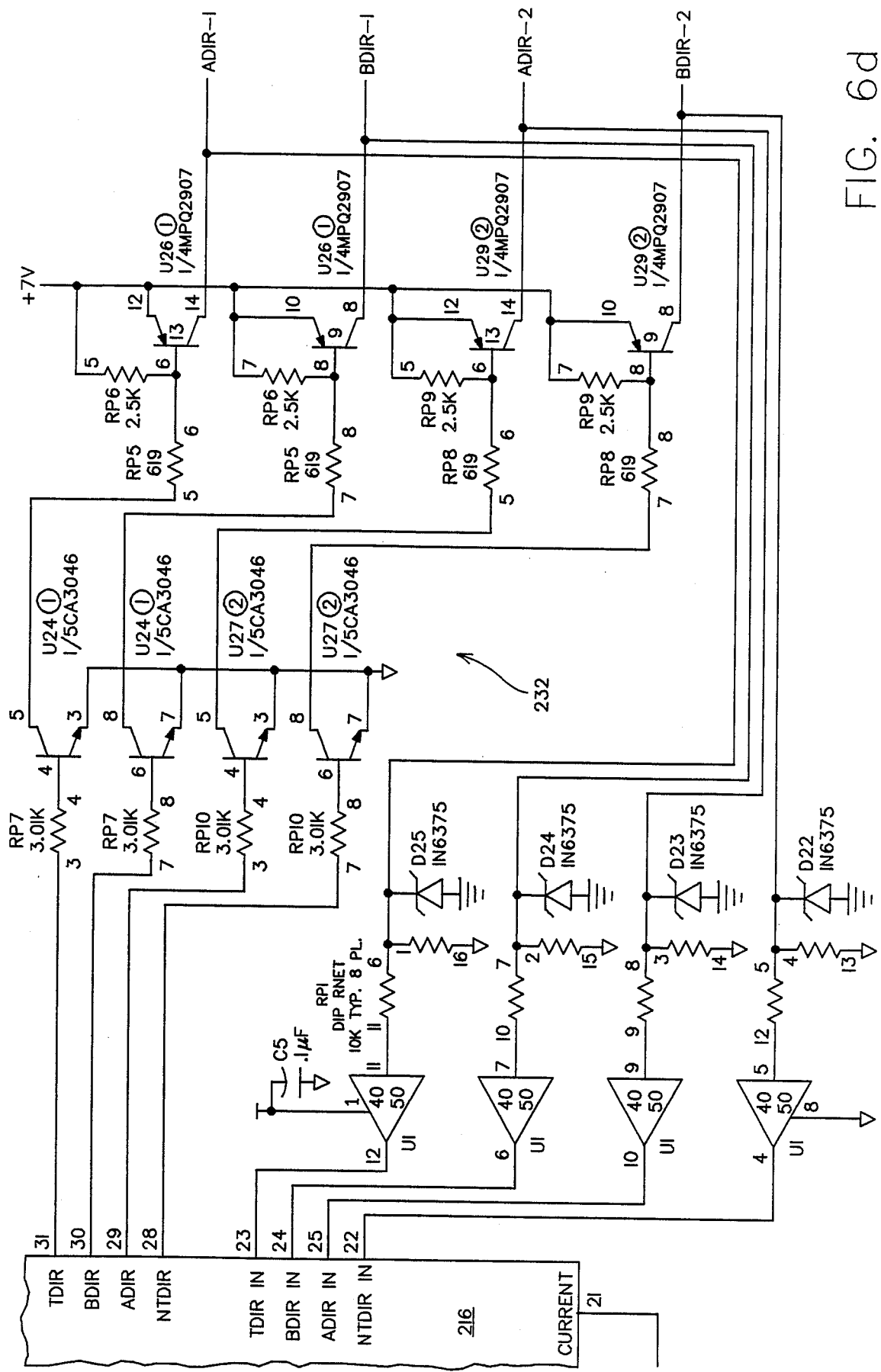
Figure 6E:
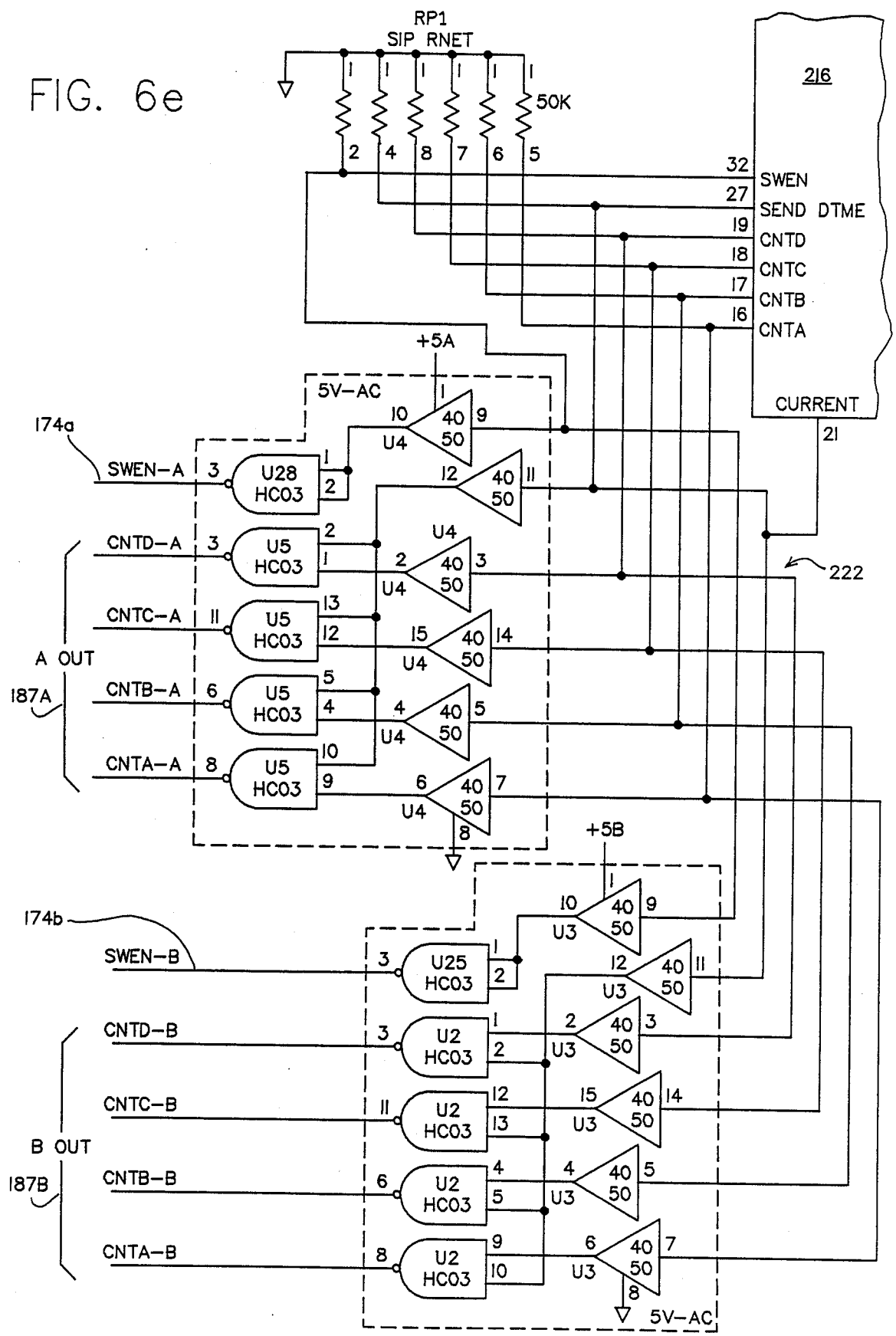
Figure 8A:
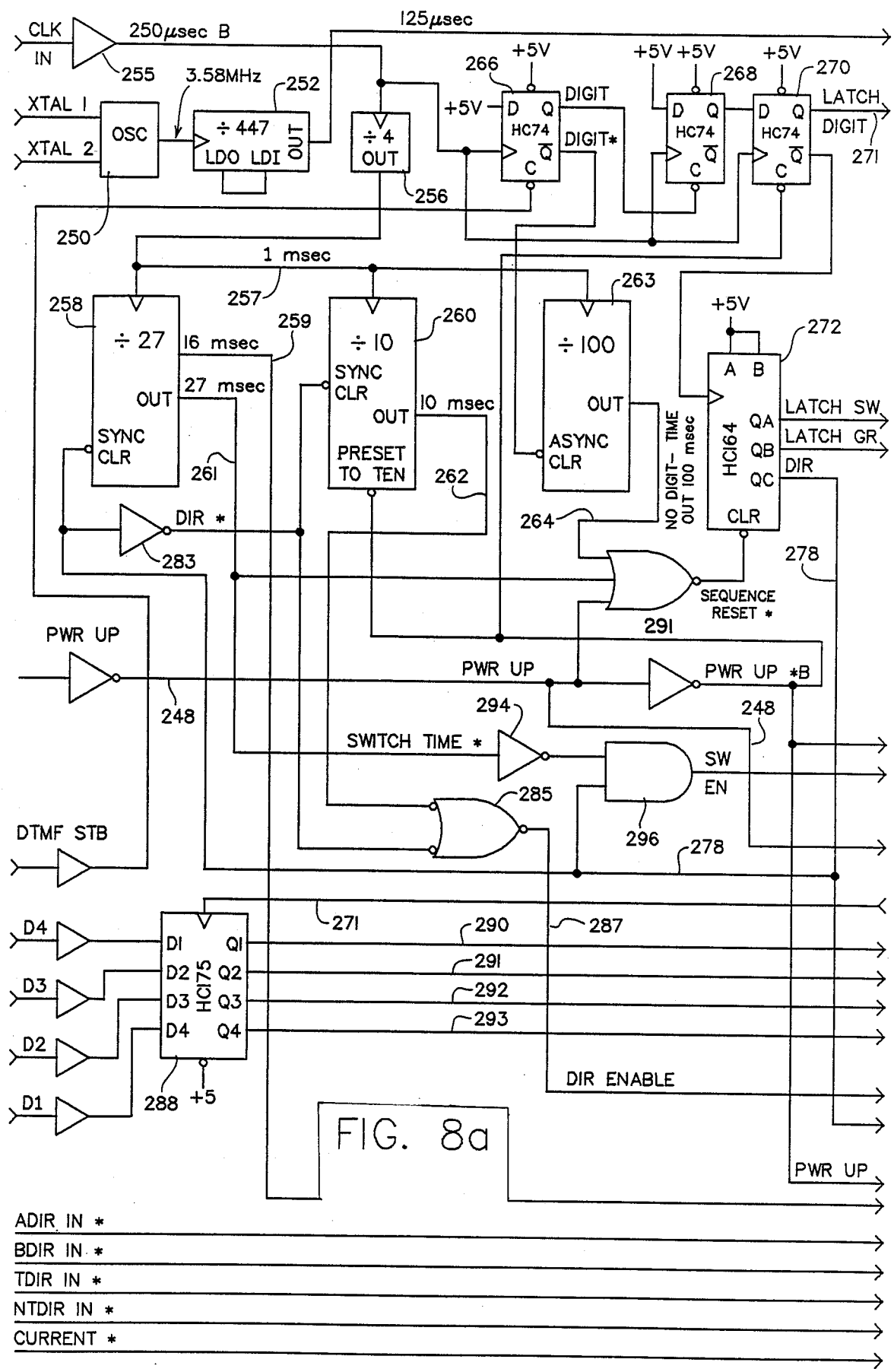
FIGS. 8A and 8B, when read together with FIG. 8A to the left and FIG. 8B to the right, form a single schematic circuit diagram of the functional equivalent of a custom integrated circuit clocked logic state controller contained within each one of the switch matrix modules of the electronic cross-connect cabinet unit as illustrated in FIG. 1.
Figure 8B:
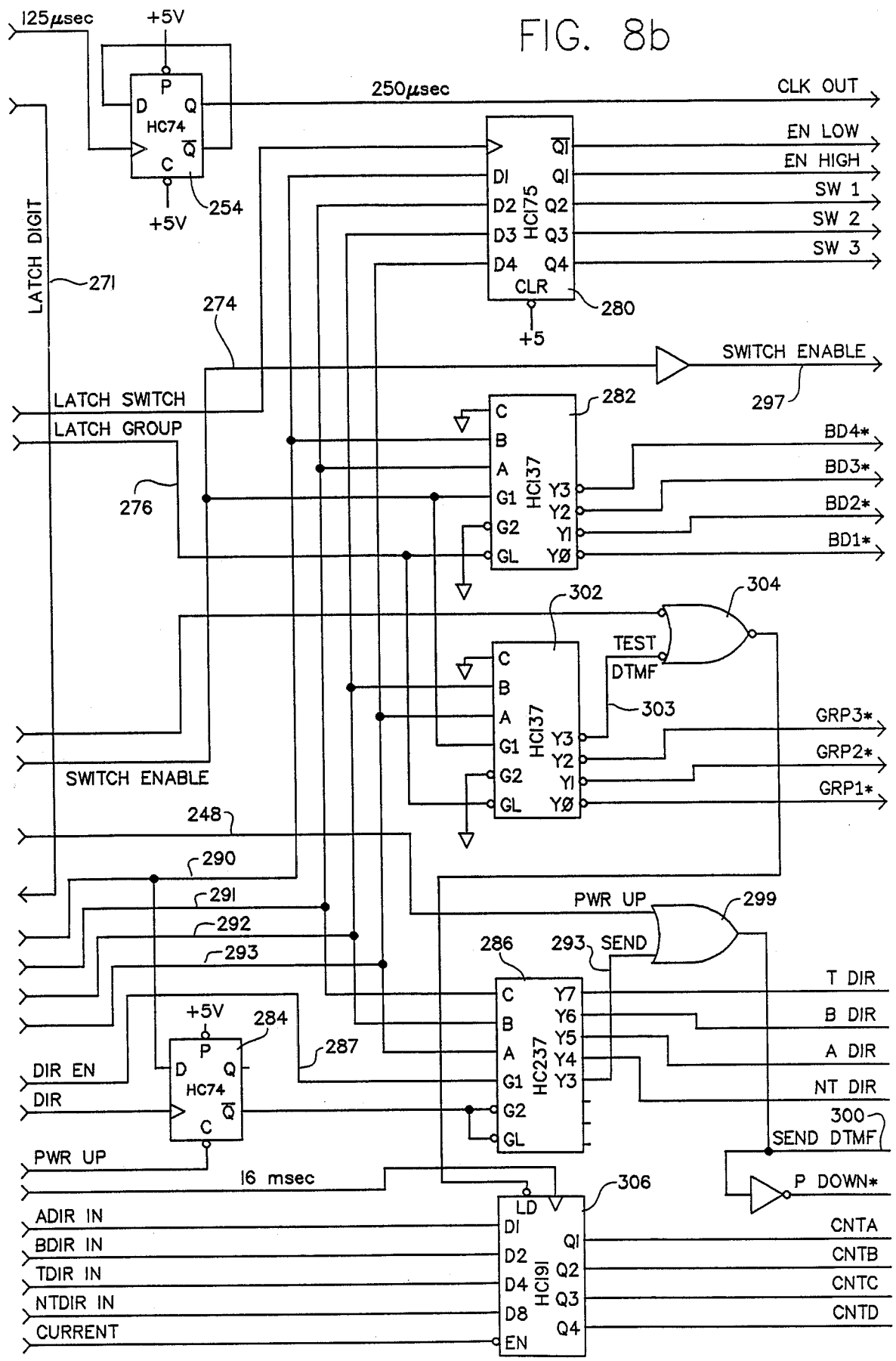

FIGS. 6A and 6E together depicts multiplexing circuitry by which data enters and leaves an integrated circuit controller chip 216 which controls and times the operations of the selected switch matrix module. The equivalent circuitry of this low power CMOS gate array chip is depicted in FIGS. 8A and 8B. The chip 216 operates under an internal clocking structure whose frequency control is established by an external crystal reference 217 and other external circuitry depicted on FIGS. 6A and 6E in association with the crystal 217.

Basically, four bit control data from the A controller data bus 168A, or data from the B controller data bus 168B, enters the chip 216 at ports D1, D2, D3 and D4. A strobe signal input is activated by a signal from a strobe bit line within the active data bus 168. An array of drivers and OR gates 218 enables the chip 216 to receive data from either the A bus or the B bus, depending upon which controller module is active during the switching interval.

A Power Up signal is provided to reset the chip 216 via the reset line of the active data bus 168. An OR gate 220 enables a reset signal to be received from either controller 40A or 40B.

Count data from the chip 216 which is indicative of the status of operation of the selected switch module 42 is returned either to the A controller count bus 187A or to the B controller count bus 187 B via routing circuitry 222. The switching is accomplished by virtue of which +5 volt power supply line carries power, whether it is from the A controller module 40A or whether it comes from the B controller module 40B.

A relay select decoding circuit is depicted in FIG. 6B. It uses four 4–16 decoder chips 224A, 224B, 224C and 224D such that one of 63 relay selection signals, SEL 1 through SEL 63, may be decoded and sent out to a selected relay pair or relay. One of 16 positions is selected by virtue of the logic state of four bit lines EN HI, SW 1, SW 2, and SW 3 leading from the chip 216. One of the four decoder chips 224A, 224B, 224C and 224D is selected by one of four "board" lines leading from the chip 216, BD 1, BD 2, BD 3 or BD 4, only one of which will be active at a time. Each relay selection output signal, such as the signal SEL 1, passes through a darlington amplifier 226 and is protected by a large current overvoltage protection bener diode 228, as illustrated in FIG. 6C.

A 64th relay selection position 230 leads nowhere and is provided as a null relay test position. This enables certain checks and verifications to be made on switch selection set-up prior to an actual switch of a relay.

Figure 7:
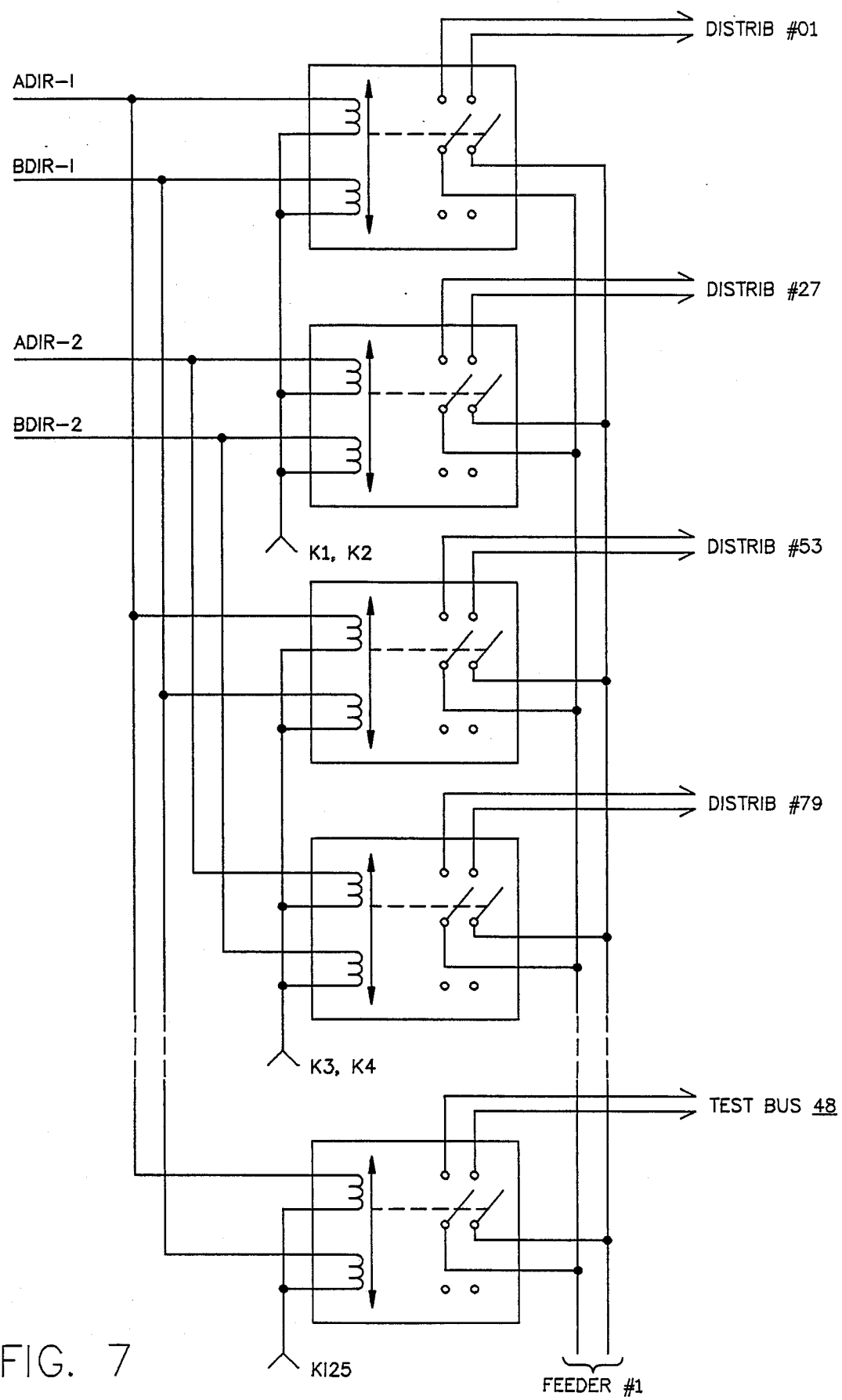
FIG. 7 is a schematic circuit diagram of the connection of several of the e.g. 125 bistable (latching) relays contained within each one of the switch matrix modules of the electronic cross-connect cabinet unit as illustrated in FIG. 1.

As shown on FIG. 6D, four lines from the chip 216, TDIR, ADIR, BDIR and NTDIR extend through drivers 232 to four switch matrix direction lines ADIR-1, BDIR-1, ADIR-2 and BDIR-2. Each of these lines is connected to one of four coils in each relay pair, such as the K1, K2 pair, as illustrated in FIG. 7. Thus, enablement of a single select line, such as SEL 1, and enablement of one of the four direction lines ADIR-1 BDIR-1, ADIR-2 and DDIR-2 enables selection of a single coil within 125 relays.

Each switch matrix board includes 125 relays, in a prearranged connection arrangement whereby each of five incoming feeder pairs may connect to 24 distribution pairs (K1 through K120). Five test relays, K121, K122, K123, K124 and K125, enable each of the five incoming feeder pairs to be bridged to the test bus leading back to the controller board 40 during the switching interval.

Feeder pair number 1 is connectable to one of distribution pairs 01, 27, 53, 79 and the test bus (as shown in FIG. 7) and pairs 105, 131, 157, 183, 209, 235, 261, 287, 313, 339 365, 391, 417, 444, 469, 495, 521, 547, 573 and 599 (not shown) in a 300 feeder pair by 600 distribution pair cabinet 30. In the same size cabinet 30, feeder pair 2 is connectable to one of distribution pairs 02, 28, 54, 80, 106 etc. In this manner the connectability of each of the three hundred feeder pairs is evenly distributed throughout the entire number of distribution pairs, and each distribution pair is capable of being connected to twelve different feeder pairs. This quasirandomization prevents service requests from bunching up feeder pairs and should assure that all distribution pairs have equal access to available feeder pairs.

State Machine 216

FIGS. 8A and 8B together describe the functional equivalent of the low power gate array chip functioning as a state machine controller 216 which forms the heart of the control circuitry for each of the e.g. 60 switch matrix boards.

During a switch command sequence, the chip 216 is reset by the power up signal on a line 248 which clears internal registers. Once a command sequence begins, an internal timer within the chip 216 times the sequence to be sure that the three digits thereof arrive within an acceptable time limit. This timer includes a crystal oscillator 250 operating at a NTSC standard format television color subcarrier frequency of 3.579545 MHz (a very popular frequency for which crystals are plenteously available at low cost) The approximately 3.58 MHz output is divided by 447 in a modulo divider 252 to produce a 125 microsecond clock. This clock is further divided by two in a flip-flop 254 to produce a 250 microsecond clock which is eternally looped back into the clock input and buffered by a buffer 255. The 250 microsecond clock signal is divided by 4 in a divider 256, to produce a one millisecond clock on a line 257, and is further divided in a divider 258 to produce a 16 millisecond clock on a line 259 and a 27 millisecond clock on a line 261. The one millisecond clock on the line 257 is further divided by 10 by a divider 260 to produce a 10 millisecond clock on a line 262; and is divided by 100 in a divider 263 to produce a 100 millisecond time out clock on a line 264.

The enabled controller module 40A or 40B sends a command of three four-bit words to the chip 21 of the selected module 42 via the switch module data bus 168. When this occurs, the DTMF STB line is active and it clocks the first one of three tandem connected flip-flops 266, 268 and 270. The output from the last flip-flop 270 on a line 271 is latch digit command occurring between 500 and 750 microseconds after the DTMF STB line becomes active. This provides an integration time for DTMF STB. If DTMF STB was a spurious signal of less than 500 microseconds, no signal will be generated on the line 271. The falling edge of latch digit 271 (after DTMF STB completes) clocks a three bit shift register 272 which thereby sequentially provides three separate enable signals: a latch switch enbble on a line 274; a latch group enable on a line 276, and a direction signal on a line 278.

The latch switch enable line 274 causes a first digit latch 280 to load the first digit which is a value for the 1/16 SEL values established by the lines EN HI, SW 1, SW 2 and SW 3 which are supplied to all four of the decoders 224A 224B 224C and 224D.

The latch group enable line 276 causes a second digit latch-decoder 282 to load the high order two bits of the second digit which includes a value BD 1, BD 2, BD 3, or BD 4. As already mentioned in conjunction with FIG. 6B, this value selects one of the decoders 224A, 224B, 224C and 224D.

The direction signal line 278 clocks a flip-flop gate 284 to enable the output of a third digit latch 286, but only if "D4" of digit 3 is active. It also extends through an inverter 283 to a NAND gate 285 also receiving the 10 millisecond delay clock on the line 262. The gate 285 puts out a direction enable signal on a line 287 to load and enable the third digit latch 286. The third digit latch 286 loads the third digit which provides the direction signals TDIR, BDIR, ADIR and NTDIR.

These signals are further amplified and processed by the FIG. 6D circuitry, as already mentioned.

The latch digit command on the line 271 causes a latch 288 to obtain each four bit digit from the switch module data bus 168 and to put it out on four lines 290, 291, 292, and 293 extending to latch 280. Two of the lines, 290 and 291, extend to the latch-decoder 282. Three of the lines, 291, 292 and 293, extend to the latch-decoder 286.

After all three digits have been loaded into the three latches 280, 282 an 286, the SW EN switch enable signal is generated. Basically, this signal is the 27 millisecond delay clock signal on the line 261 which is passed through an inverter 294 and an AND gate 296. The other input to the AND gate 296 is the direction enable signal on the line 278, which means that the SW EN signal will not be sent until after the third digit is latched in the state sequence of the chip 216.

A three input OR gate 291 causes the state of the three bit control decoder 272 to be cleared on a power up, at the end of every 27 millisecond switching interval or after 1100 milliseconds in any event. Thus, unless a proper three digit command sequence safely arrives at the controller chip 216 within the allotted time intervals, the chip 216 resets itself and will not proceed to activate any relay switch.

At the completion of the 27 millisecond switching enable time, the OR gate 291 resets the shift register 272, as already explained. When the DIR line 278 is accordingly deactivated, the clear is removed from the timer 260 via an inverter 283. The timer 260 now times for ten milliseconds from the completion of the 27 millisecond switching interval. The state of the ten millisecond line 262 keeps DIR ENABLE active via NAND gate 285. This provides the time needed by the addressed relay coil to inductively kick back through the direction driver transistors.

Operation of the Cross-Connect Cabinet 30

Once a central office controller unit 22 has been commanded to take action with respect to a particular cross-connect cabinet, such as the cabinet 30a of FIG. 1, it locates one of the two control pairs 26, such as the pair 26a and applies power to that pair.

The controller unit 40A receives the power from the control pair 26a, and that power passes through the full wave rectifier 194 to be sure that it is of correct polarity (i.e. tip and ring wires are not reversed). The relay control 196 causes relays Kl (FIG. 3) to switch, thereby disabling the control line 26b to the second controller 40B, and thereby connecting the control line 26b to the controller 40A external test port 47A.

A power on rest on the line 108 resets the microprocessor 102 to an initialization routine in which internal registers are cleared and the controller 40A is thereupon set to receive commands from the central office supervisor 22 via DTMF signalling sequences on the pair 26A. These sequences are decoded by the DTMF decoder 204 and latched into the DTMF latch 136 whereupon they may be read and acted upon by the microprocessor 102.

The first command sequence received from the central office controller is for the cross-connect cabinet 30a to identify itself. When this command is received, the microprocessor 102 causes the latch 132 to write to an ID programming field wired at the backplane 36 during a write cycle, and it then reads the latch 130, the inputs of which are connected to the same ID programming field wired at the backplane 36 during a read cycle. The sequence of writing to latch 132 and reading from latch 130 repeats four times to read the eight digits (4 bits each) of ID field data.

The ID field uniquely identifies the cabinet 30A. Using the DTMF generator 106, the microprocessor 102 sends back to the central office unit 22 a DTMF sequence carrying the values it has read at the ID latch 130. This identification sequence is then verified by the central office unit 22. Thus, not only has the central office unit 22 selected and activated a particular control pair 26A, it has actually confirmed that the correct cross-connect cabinet 30A is attached to this pair.

During a switching interval where a particular switch is to be accessed and activated (either to make a connection or break a connection), a command sequence ss sent by the unit 22 to the controller 40A which enables it to identify the particular switch matrix card 42 and the particular latching relay switch on that card that is to be accessed.

The controller 40A then applies power to all of the comparators 209 on the A bus side of all of the switch matrix boards 42 (FIG. 5). The controller 40A then addresses the selected card 42 by the binary value it places on the matrix board address bus 166. All of the comparators 209 receive the unique identifier value via the bus 166A and compare the value to their respective identification field wired a the backplane 36. Only one of the comparators will determine an equivalence, and when that happens, the line 212 becomes active, thereby applying switching and operating power to the remainder of the control circuitry present on that particular switch matrix board, including the state machine 216.

Next, the controller card 40A sends a series of three four-bit (hexadecimal) digit command sequences to the active card 42. Each firs digit of each proper 3 digit sequence is latched to the first digit latch 280 of the state machine 216 (FIG. 8B). The second digit is latched into the second digit latch/decoder 282, and the third digit is latched into the third digit latch/decoder 286. Automatically, the state machine 216 verifies that all three digits have been successfully loaded and after a predetermined interval it "fires" the selected switch relay by activating the Switch Enable line 297 which completes the addressing process of the selector decoders 224.

However, before an actual switch is addressed, the direction lines are set up and verified. In order to make this check, the default SEL location 64 is used as the switch address for a test direction sequence. Since only one of the direction lines ADIR-1, BDIR-1, ADIR-2 and BDIR-2 may properly be active during a switching interval in order to address a single coil winding of one of the pair of switches identified by the SEL value, a method for checking this setup is provided by a send line 293 leading from the third digit direction latch 286 through an OR gate 299 which becomes a SEND DTMF control line 300. This line 300 enables the drivers in the 222 circuitry, placing the CNTA-D data on the bus 187.

The bus 187 is monitored by the controller 40A via the comparators 188 during a read cycle. It is monitored to determine that the signal is present at the correct time. This is a verification that the particular state machine 216 of the selected switch matrix card 42 is operating correctly. The send line is activated by a particular third digit value loaded during a test sequence.

Normally, a test direction counter 306 will increment every time a three digit actuation sequence is performed by the state machine 216. The Send DTMF line 300 comes back into the state machine 216 on the CURRENT line and thereupon disables the test direction counter 306 from incrementing.

The test DIR counter 306 is clocked by the 16 millisecond delay clock signal on the line 259 whenever the current line is active (i.e. The Send DTMF line 300 state is inactive). The counter 306 is loaded by a TEST DTMF signal generated as follows: When the second digit is latched into the latch 282, only the high order two of the internal data lines, i.e. lines 290, 291, enter the latch 282. The low order two of the internal data lines, 292 and 293 enter the latch 302 and it is strobed by the latch group control signal on the line 276. One of the output lines of the latch 302 is the TEST DTMF line 303 which leads through an OR gate 304 to load the test counter 306.

The latching counter 306 receives the state of the four direction lines ADIR-1, BDIR-1, ADIR-2, and BDIR-2 on the TDIR, BDIR, ADIR and NTDIR lines fed back to the state machine 216 via the FIG. 6D feedback circuitry.

So at the end of the first three digit sequence, a direction line has been activated without actuation of a relay and the direction value has been loaded into the test direction counter 306. Another three digit sequence follows and instead of sending a new direction value, the SEND DTMF line 300 becomes active and the count latched into the direction counter is enabled onto the count bus 187. The latch 306 provides four output count lines, CNTA, CNTB, CNTC and CNTD which are returned to the controller 40A via the count bus 187 and the latch 134. The controller 40A thereupon reads the count data to verify that the direction lines are set up correctly.

After the direction line setup has been verified by the controller 40A, another three digit sequence is sent to the board. This sequence actually addresses the intended relay switch, and the proper coil thereof becomes energized and draws current from the 8 volt supply line.

The current drawn by a single coil is a known value and it is converted into a voltage by the relay current monitor circuit 152 of the controller 40A and monitored by the microprocessor 102 via the analog to digital converter 150. If no coil current is monitored during an actual switching sequence, or if excessive coil current is detected, the controller 40A determines that an error condition is present and sends an error message to the central office unit 22 via DTMF signals passed through the DTMF generator 106 and the control pair 26.

Other supply voltages sent to a selected module are also monitored by the microprocessor 102 via the analog to digital converter. If insufficient or excessive supply voltages are present, this error situation is noted and reported back to the central office. If the control circuitry of a particular switch matrix module fails, it may still be possible to establish a connection between an available feeder pair and a desired distribution pair via another switch module for an available feeder which is itself connectable to the desired distribution pair. This need for rerouting is relayed back to the console computer 14, and a decision may b made whether to carry out rerouting or to dispatch service personnel to service the subject cross-connect cabinet 30.

Thus, it will be appreciated that there are many separate checks provided automatically by the cabinet controller 40A and the selected switch matrix card 42 to ensure that only the correct relay is addressed, and that it actuates properly.

A variety of test conditions may be locally established at the cross connect cabinet via relays selectable by the set and reset latches 126 and 128. These relays work in conjunction with the test relay e.g. K125 (FIG. 7) which may be bridged across any feeder pair or any feeder/distribution pair, under programming control. When the test relay K125 of a particular card 42 is actuated (set), the feeder pair #1 via the test bus 48, may be provided with tip-ring-ground shorting patterns or attached to the external test bus 47A (control pair 26b when controller 40A is active), for testing at the test board of the central office. Thus, bad or leaky feeder pairs may be checked automatically to the cross-connect cabinet 30 without need for any service personnel to travel to the field.

Operating temperature within the cross-connect cabinet 30 is a parameter capable of being monitored at the central office during a switching interval. This parameter may be pertinent if ambient temperature is above or below the rated operating temperature of the latching relays. (If this is so, switching is deferred until ambient conditions have raised or lowered the internal cabinet temperature to lie within the operating temperature limit temperature within the cabinet 30 is sensed by a suitable sensing element 46, such as a thermistor, converted to digital by the analog to digital converter 150 and transmitted to the central office unit 22 by DTMF signalling through the DTMF generator 106 and the control pair 26.

Having thus described a presently preferred embodiment of the present invention, it will now be appreciated that the objects of the invention have been fully achieved and it will be understood by those skilled in the art that many changes in construction and circuitry and widely differing embodiments and applications of the invention will suggest themselves without departing from the spirit and scope of the invention. The disclosures and the description herein are intended to be illustrative and are not in any sense limiting of the invention, more particularly defined in scope by the following claims.

I claim:

1. In a telecommunications system outside plant facility characterized by a multiplicity of communications path feeder pairs leading from a main distribution frame at a central office to subscriber locations via feeder cables extending to a plurality of normally unpowered cross-connect cabinets located remotely from the central office, and distribution cables of distribution pairs leading from terminal blocks adjacent to subscriber locations to said cross-connect cabinets, and further including central office supervisory equipment located at the central office, an improved normally unpowered electronic cross-connect cabinet comprising:

a backplane for terminating all of said feeder pairs and all of said distribution pairs, a control pair lead in from the central office supervisory equipment to the backplane via a feeder cable terminating thereat, an electromechanical switching matrix comprising an array of switching relay module means, each module means containing an array of bistable latching relays, each latching relay for selectively connecting and disconnecting a said feeder pair to a selected one of a plurality of distribution pairs, each module means including control circuitry for locating and actuating a said one of said latching relays, electronic cabinet control means connected to the backplane for locating, connecting power to and operating a selected one of said electromechanical switching matrix modules and further for locating, connecting switching power to and operating said one of said latching relays of said selected switching matrix modules in order to switch the relay from one stable switching state to another stable switching state and thereupon to remove switching power therefrom during a connection switching interval, said electronic control means receiving all required power and switching information from the central office supervisory equipment via said control pair.

2. The electronic cross-connect cabinet set forth in claim 1 wherein the central office supervisory equipment receives cross-connect operational information from a control source and operates at least one of a plurality of uniquely identified, like cross-connect cabinets with which it is physically associated by selecting the said cross-connect cabinet specified by the operational information, by selectively sending said power and said switching information during a said switching interval to said selected cross-connect cabinet.

3. The electronic cross-connect cabinet set forth in claim 2 further comprising a cabinet identification field readable by said electronic control means for establishing electrically the identity of said cabinet and for verifying electrical identification to the central office supervisory equipment via the control pair.

4. The electronic cross-connect cabinet set forth in claim 1 wherein said cabinet is configured as a replacement module to replace a preexisting manual cross-connect array within an existing cross-connect cabinet and wherein said automated central office supervisory means is provided at the central office with which the existing cross-connect cabinet is physically associated and programmed to operate said existing cross-connect cabinet.

5. The electronic cross-connect cabinet set forth in claim 1 wherein said cabinet control means connected to the backplane for operating said electromechanical switching matrix comprises at least two independently controllable cabinet controllers, each being connected to a separate control pair extending from the central office supervisory means.

6. The electronic cross-connect cabinet set forth in claim 1 further comprising test means for bridging of a test trunk onto each communications path feeder pair thereby enabling the central office to test said bridged pair.

7. The electronic cross-connect cabinet set forth in claim 5 further comprising two control pairs, one leading to a first said controller, and automatic switching circuitry so that when one of said controllers receives power via a control pair to which it is connected, that power switches a control pair to which a second said controller is normally connected to the first said controller as a test pair, and wherein said electronic cross-connect cabinet further comprises test means under the control of said first controller for bridging of said test pair onto a selected communications path feeder pair via a selected switch matrix module and a test relay provided on said module, thereby enabling the central office to test said selected feeder pair.

8. The electronic cross-connect cabinet set forth in claim 1 wherein each said switching relay module means is identical with every other switching relay module means, wherein all switching relay module means plug into said backplane, and wherein a programming field readable by said control circuitry of each said module means establishes a unique electrical identification for the said module means.

9. The electronic cross-connect cabinet set forth in claim 1 wherein correspondence between a programming field of a said module plug in location and an electrical address provided by said cabinet controller means automatically causes power to be supplied to control circuitry of a switch matrix module plugged into said backplane at said location, thereby enabling a relay of said module to be addressed and activated during a switching interval.

10. The electronic cross-connect cabinet set forth in claim 1 wherein each switch matrix module includes test means connected to said cabinet controller means for verifying proper addressing of a said relay before it is actually energized.

11. The electronic cross-connect cabinet set forth in claim 1 wherein the control circuitry of each switch matrix module comprises a sequential state machine including internal timing means for timing the states through which the control circuitry sequences during a switching interval.

12. The electronic cross-connect cabinet set forth in claim 7 further comprising test state logic under the control of said first cabinet controller for applying test conditions at said cabinet to said test pair during a switching interval.

13. The electronic cross-connect cabinet set forth in claim 1 wherein said electronic cabinet controller means comprises milliampere monitoring means connected to a switch power line leading to a said selected switch matrix module for measuring current draw on said switch power line during actual switching of a said relay thereby to verify operation by a single relay coil during actual switching.

14. The electronic cross-connect cabinet set forth in claim 1 wherein said switching information is provided to said electronic controller means of said electronic cross-connect cabinet from said central office supervisory unit via dual tone multi-frequency signals superimposed on a direct current power supply flowing on said control pair during a switching interval, and further comprising dual tone multi-frequency detection means within said electronic controller means for receiving and decoding said switching information during a switching interval.

15. The electronic cross-connect cabinet set forth in claim 3 further comprising dual tone multi-frequency generation means within said electronic controller means for sending said electrical identification to the central office supervisory equipment via dual tone multi-frequency signals superimposed upon a direct current power supply flowing to said cross-connect cabinet via the control pair during a switching interval.

16. The electronic cross-connect cabinet set forth in claim 1 further comprising environmental sensing means within said cabinet connected to said cabinet controller means for reporting environmental conditions at said cabinet during a said switching interval to said central office supervisory equipment.

17. The electronic cross-connect cabinet set forth in claim 1 wherein each switch matrix module includes at least one feeder pair connectable by relays to at least 24 distribution pairs.

18. The electronic cross-connect cabinet set forth in claim 17 wherein said backplane is configured so that each distribution pair has direct switch access to at least 12 feeder pairs within the cabinet.

19. A telecommunications system including at least one central office including an electronic supervisor for supervising a plurality of normally unpowered outside plant electronic cross cabinets and a plurality of normally unpowered electronic cross-connect cabinets located remotely from the central office for automatically establishing at least one connection arrangement between predetermined ones of distribution pairs and feeder pairs terminated at the cabinets during a powered-up connection switching interval, each cabinet being connected to the electronic supervisor via a control pair in a feeder cable extending from the central office to the cabinet, the electronic supervisor at the central office for automatically locating, applying power to, verifying the identity of and supervising automatic switching operations at a selected one of said plurality of electronic cross-connect cabinets by providing operating power and signalling information to the selected one via the control cable to which it is attached, and for thereafter automatically removing operating power from the selected one of the electronic cross-connect cabinets, the connection arrangements established the in during the switching interval remaining established after operating power has been removed from the cabinet.

20. The telecommunications system set forth in claim 19 wherein the normally unpowered electronic cross-connect cabinet includes:
 a backplane for terminating all of said feeder pairs and all of said distribution pairs,
 a control pair leading from the central office supervisory equipment to the backplane via a feeder cable terminating thereat,
 an electromechanical switching matrix comprising an array of switching relay module means, each module means containing an array of bistable latching relays, each latching relay for selectively establishing a connection arrangement between a said feeder pair and a selected one of a plurality of distribution pairs, each module means including control circuitry for locating and actuating a said one of said latching relays during a connection arrangement establishment interval,
 electronic cabinet control means connected to the backplane for locating, connecting power to and operating a selected one of said electromechanical switching matrix modules and further for locating, connecting switching power to and operating a selected one of said latching relays of said electromechanical switching matrix modules during the connection arrangement establishment interval in which the relay is powered to switch from one stable switching state to another stable switching state, and thereupon for removing switching power from the selected relay and module, said electronic control means receiving all required power and switching information from the electronic supervisor at the central office via said control pair.

* * * * *